(12) United States Patent
Gudger et al.

(10) Patent No.: US 9,037,119 B1
(45) Date of Patent: May 19, 2015

(54) DIALING WIRELESS SKIP-TRACE NUMBERS IN A CONTACT CENTER

(71) Applicant: Noble Systems Corporation, Atlanta, GA (US)

(72) Inventors: Teresa Gudger, Atlanta, GA (US); Karl H. Koster, Sandy Springs, GA (US)

(73) Assignee: NOBLE SYSTEMS CORPORATION, Atlanta, GA (US)

( * ) Notice: Subject to any disclaimer, the term of this patent is extended or adjusted under 35 U.S.C. 154(b) by 0 days.

(21) Appl. No.: 14/494,171

(22) Filed: Sep. 23, 2014

Related U.S. Application Data

(63) Continuation-in-part of application No. 13/958,011, filed on Aug. 2, 2013, which is a continuation of application No. 13/902,130, filed on May 24, 2013, now Pat. No. 8,738,076.

(60) Provisional application No. 61/813,713, filed on Apr. 19, 2013.

(51) Int. Cl.
  *H04M 3/00* (2006.01)
  *H04M 5/00* (2006.01)
  *H04M 3/42* (2006.01)
  *H04M 15/00* (2006.01)
  *H04W 4/16* (2009.01)
  *H04M 3/51* (2006.01)

(52) U.S. Cl.
  CPC ............ *H04M 3/42102* (2013.01); *H04W 4/16* (2013.01); *H04M 3/5183* (2013.01)

(58) Field of Classification Search
  CPC .................................. H04M 1/00; H04W 4/16
  USPC .......................... 455/414, 414.1; 709/228, 231; 379/265.01, 265.02, 266.1, 266.07, 379/114.03
  See application file for complete search history.

(56) References Cited

U.S. PATENT DOCUMENTS

| | | | |
|---|---|---|---|
| 5,850,433 A | 12/1998 | Rondeau | |
| 6,198,814 B1 | 3/2001 | Gill | |
| 6,621,900 B1 | 9/2003 | Rice | |
| 7,783,290 B2 | 8/2010 | Kim | |
| 8,606,245 B1 | 12/2013 | Eccelston et al. | |
| 8,712,032 B1 * | 4/2014 | Leary et al. | 379/266.07 |
| 2002/0176405 A1 | 11/2002 | Aijala | |

(Continued)

OTHER PUBLICATIONS

Office Action received for U.S. Appl. No. 13/958,011 dated Dec. 13, 2013.

(Continued)

*Primary Examiner* — Opiribo Georgewill

(57) ABSTRACT

A contact center dialing a telephone number to a destination party, such as a debtor, may discover that the number is obsolete, e.g., the number has been reassigned to a new subscriber. A purportedly current number (called a 'skip-trace' number) may be obtained for the debtor, which may be a wireless number. Until the wireless skip-trace number has been confirmed as being associated with the debtor, an agent manually dials that number to minimize liability to the contact center. Once the agent has verbally confirmed the skip-trace number is associated with the debtor, a record for this number in a dialing list is updated allowing future dialing attempts to occur automatically, by using a predictive dialer. In one embodiment, a dialing list module processes the dialing list so as to detect when a number is obsolete and update the corresponding record when the number is confirmed.

20 Claims, 18 Drawing Sheets

(56) References Cited

U.S. PATENT DOCUMENTS

| | | | |
|---|---|---|---|
| 2003/0231750 A1* | 12/2003 | Janveja et al. | 379/114.03 |
| 2004/0042611 A1 | 3/2004 | Power et al. | |
| 2004/0170258 A1 | 9/2004 | Levin et al. | |
| 2004/0179672 A1* | 9/2004 | Pagel et al. | 379/266.1 |
| 2005/0048967 A1 | 3/2005 | Hoglander et al. | |
| 2005/0232410 A1 | 10/2005 | Gonzalez | |
| 2007/0015553 A1 | 1/2007 | Siddiqui | |
| 2008/0270279 A1 | 10/2008 | Rowe | |
| 2009/0003316 A1 | 1/2009 | Lee et al. | |
| 2011/0165858 A1 | 7/2011 | Gisby et al. | |
| 2012/0088475 A1 | 4/2012 | Portman et al. | |
| 2012/0124227 A1* | 5/2012 | Al-Khowaiter et al. | 709/228 |
| 2013/0065558 A1 | 3/2013 | Oneil et al. | |
| 2013/0143539 A1 | 6/2013 | Baccy et al. | |
| 2013/0202101 A1 | 8/2013 | LaBoyteaux et al. | |
| 2013/0316677 A1 | 11/2013 | Aharon | |
| 2014/0115486 A1 | 4/2014 | Benson et al. | |
| 2014/0133643 A1 | 5/2014 | Claudatos et al. | |

OTHER PUBLICATIONS

Notice of Allowance Received for U.S. Appl. No. 13/958,011 dated Nov. 5, 2014.
Office Action received for U.S. Appl. No. 13/958,011 dated Mar. 26, 2014.
Office Action received for U.S. Appl. No. 13/958,011 dated Jul. 17, 2014.
USPTO Office Action for U.S. Appl. No. 13/902,130 dated Dec. 17, 2013 (33 pages).
USPTO Notice of Allowance for U.S. Appl. No. 13/902,130, dated Apr. 1, 2014 (18 pages).
Noble Systems Corporation, Maestro 2010.1.1 User Manual, vol. 1, Aug. 17, 2010, 454 pages, Noble Systems Corporation, Atlanta, GA. 30319.
Noble Systems Corporation, Maestro 2010.1.1 User Manual, vol. 2, Aug. 3, 2010, 416 pages, Noble Systems Corporation, Atlanta GA 30319.
Noble Systems Corporation, Maestro 2010.1.1 Manual, vol. 3: Aug. 18, 2010, pp. 1-124, Noble Systems Corporation, Atlanta, GA.30319.
Noble Systems Corporation, Maestro 2010.1.1 Manual, vol. 4: IVR, Oct. 27, 2010, pp. 1-318, Noble Systems Corporation, Atlanta, GA. 30319.
Noble Systems Corporation, Harmony version 3.1 User Manual, Last revised May 9, 2013, 236 pages, Noble Systems Corporation, Atlanta, GA. 30338.

* cited by examiner

DIALING WIRELESS SKIP-TRACE NUMBERS IN A CONTACT CENTER

CROSS REFERENCE TO RELATED APPLICATIONS

This application is a continuation-in-part of U.S. patent application Ser. No. 13/958,011 filed on Aug. 2, 2013, now U.S. Pat. No. 8,989,814, which in turn is a continuation of U.S. patent application Ser. No. 13/902,130, filed on May 24, 2013, which is now U.S. Pat. No. 8,738,076, which claims priority to U.S. provisional patent application 61/813,713, filed on Apr. 19, 2013, the contents of which are incorporated by reference for all that they teach.

FIELD OF INVENTION

This disclosure generally relates to concepts and technologies for originating a call by a contact center to a particular type of wireless number while complying with regulatory requirements related to dialing wireless numbers.

BACKGROUND

Contact centers originating calls to wireless numbers must comply with the Telephone Consumer Protection Act ("TCPA", see e.g., 47 U.S.C. §227) that regulates, in part, aspects of originating calls to wireless numbers using certain types of equipment. Specifically, the TCPA requires that a call to a wireless number should be manually dialed if there is no express consent provided by the called party to receive calls at that number, as opposed to using an autodialer. If express consent has been provided, then the contact center may use an autodialer to dial that wireless number.

In various circumstances, a contact center attempting to reach an individual may discover the individual has relinquished their telephone number. In such cases, the telephone number is "obsolete" with respect to the targeted individual. The reasons for this can vary. For example, the telephone number may have been a wireline number and the individual may have moved to another city or state. The user may not have been able to, or may have chosen not to, port their number to their new location. In other examples, the telephone number may have been a wireless number and the individual may have chosen to discontinue their mobile phone service. In certain instances, the individual may have been delinquent in paying their bills and the service may have been disconnected with the number removed from service. The individual may restore service, but with another number. These and other situations may result in a telephone number being relinquished or becoming obsolete. If the number is dialed shortly after being relinquished, an intercept announcement may be provided to the caller. After a while, the service provider may reassign the number to another individual. Consequently, calls to that number which are intended for the previous subscriber may be answered by the current subscriber.

The contact center may dial the telephone number and discover that the number is no longer in service or has been reassigned. In either case, the number is considered obsolete and is no longer associated with the individual that the contact center is attempting to reach. In such circumstances, the contact center may utilize a third-party vendor to locate a current telephone number for that individual. Such vendors are sometimes referred to in the industry as "skip-trace" vendors. These may provide a real-time service where queries are processed to return a skip-trace number. The origin of this term may be related to usage in a debt-collection context, where an individual owes money for a debt, and has attempted to "skip-out" from paying their debt by purposefully relinquishing their telephone number and obtaining a new one. By obtaining a new number, the debtor may avoid being contacted using the old number. The skip-trace vendor will "trace" the individual by searching for a new number for that individual and provide it to the debt collector for a fee. The debt-collector, in turn, may operate or hire the contact center to contact the debtor.

In practice, there is little difference between a skip-trace number provided by a skip-trace vendor to a debt collector and a telephone number provided by a directory service provider to a contact center. However, reference to a skip-trace number is based on the context of a debt-collector attempting to contact an individual that owes a debt, and implies that the debt-collector has an obsolete telephone number. Thus, the skip-trace number is the purportedly current number of the debtor. Since the skip-trace vendor may receive compensation for providing the skip-trace number, the skip-trace vendor may not always fully verify that the number is correct before providing it.

When the contact center dials the skip-trace number, the contact center must still comply with the terms of the TCPA. As noted above, the skip-trace number may not always be correct. Thus, one problem addressed by the present disclosure is ensuring that compliance related regulations and policies are adhered to by the contact center while also complying with the TCPA mandate that prohibits using an "autodialer" to call wireless numbers without express consent. It is against this backdrop that the concepts and technologies disclosed herein are presented.

BRIEF SUMMARY

Technologies are generally presented herein pertaining to systems and methods for processing one or more dialing lists by a contact center involving a skip-trace number. In one embodiment, if the skip-trace number is a wireless number, then the contact center should manually dial the skip-trace number until the number has been confirmed. Once confirmed, the wireless skip-trace number can be dialed using an automated dialing technique. In one embodiment, the contact center uses a single dialing list which comprises records for both confirmed wireless skip-trace numbers and unconfirmed wireless skip-trace numbers. In another embodiment, the contact center uses dual dialing lists which separately contain the confirmed wireless skip-trace numbers and the unconfirmed wireless skip-trace numbers. In various embodiments, different contact center architectures may be used for processing the single or dual dialing lists.

In various embodiments, a number in a dialing list may be discovered to be obsolete. For instance, in one embodiment, the number may have been dialed using an automated dialing technique, and determined to be obsolete by detecting an intercept announcement using equipment, including, for example, digital signaling processing equipment. Upon detection, the record in the dialing list is updated to reflect that the number is obsolete. In another embodiment, the call may be connected to an agent, and the agent converses with a live person, who informs the agent that the number is obsolete, e.g., it has been reassigned. In one embodiment, the agent may respond by indicating to the system originating the call that the number is obsolete, whereupon the system may update the record in the dialing list to reflect that the number is obsolete.

The subject matter disclosed herein may be implemented as a computer-controlled apparatus, a computer process, a computing system, or as an article of manufacture such as a non-transitory computer readable storage medium. These and various other features will be apparent from the following Detailed Description and the associated drawings.

This Summary is provided to exemplify concepts in a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein.

Figure 1:
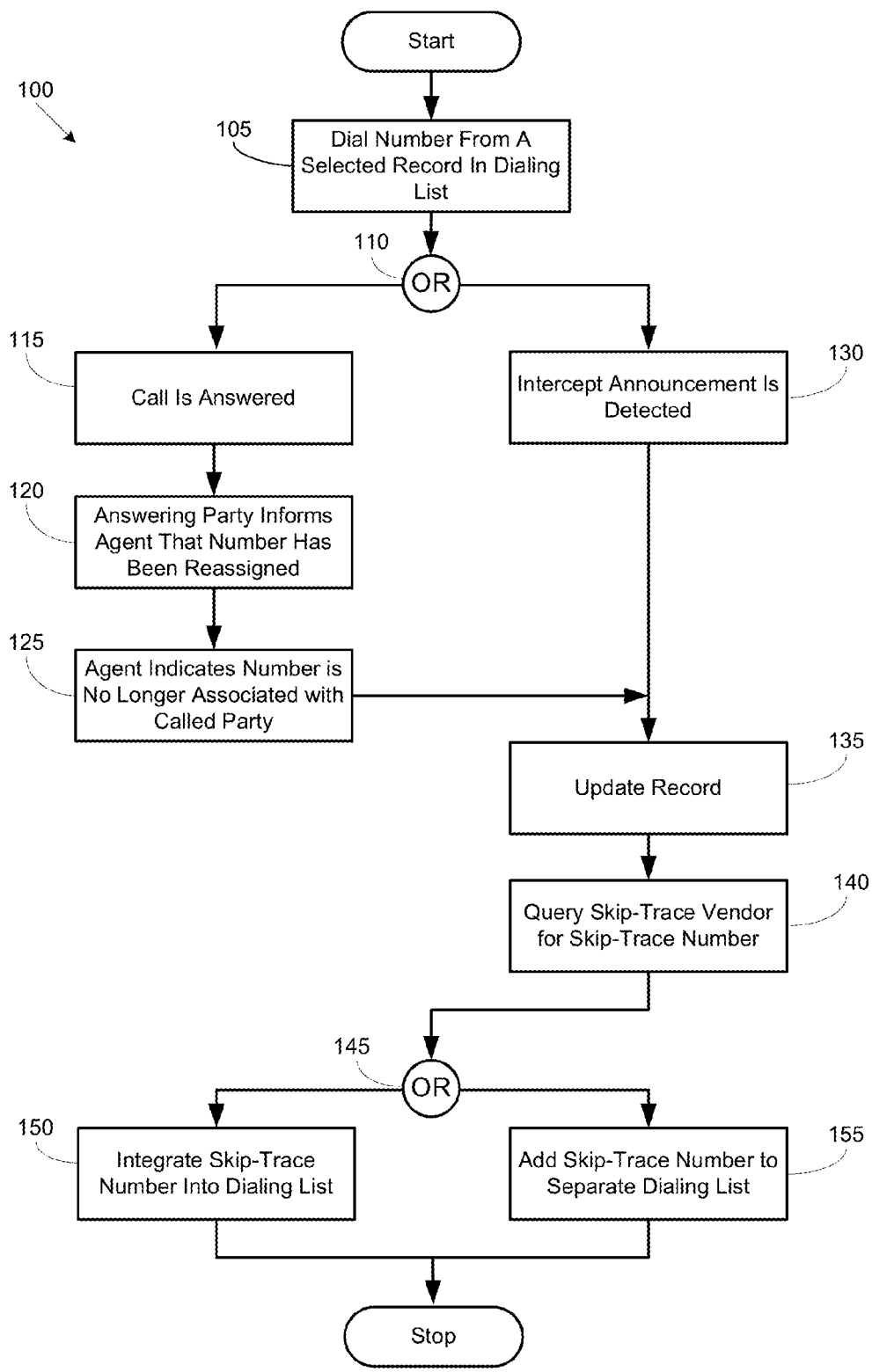
FIG. 1 shows one embodiment of a process flow used by a contact center for determining when to obtain a skip-trace number.

Finally, the drawings found in the aforementioned referenced patent applications are incorporated by reference.

DETAILED DESCRIPTION

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. As will be evident, there are a number of variations on the embodiments disclosed herein, but which are based on similar concepts and goals Like numbers in the drawings refer to like elements throughout.

GLOSSARY

The following terms are to be given the following meanings, when used in the appropriate context. For example, the word "number" may be used in this specification in a different context, e.g., to refer to a specific amount, as opposed to meaning a "telephone number." Further, the terms defined herein are not necessarily applicable to any parent patent applications from which priority is claimed or which are incorporated by reference. Examples included in a definition are not intended to be exclusive.

ADS—(automatic dialing system) a computer-based processing system used in a contact center for originating automatically dialed calls.

Autodialer—a specific type of an ADS which comports with the definition of the same as defined in the Telephone Consumer Protection Act.

Agent—an employee in a contact center employed to handle communications. An agent typically will handle voice communications, but may handle other forms of communication as well.

Automatically Dialed—a call originated by a computer program as opposed to being manually dialed.

Contact Center—a business entity engaged in receiving and/or originating communications to individuals or other businesses, wherein the communications have a common purpose (e.g., customer service, debt collection, telemarketing, taking reservations, etc.).

Current Number—a telephone number that is presently associated with an individual.

Confirmed Number—a telephone number that has been confirmed in some aspect. This would include, but is not limited to, a number that is determined to be associated with a particular individual.

Consent—authorization provided by the person associated with a telephone number to receive calls on that telephone number.

Dialing List—a list of records used by an ADS when originating calls from a contact center.

Disposition Code—information associated with a call processed in a contact center describing an aspect, outcome, or characteristic of the call.

Dispositioning the Call—the act of an agent providing a disposition code.

[ . . . ] Indicator—data indicating the specified information. In the context of a database record, this may be a portion of or the entire field in the record conveying the specified information.

Manually Dialed—a call originated as a result of human intervention, which includes an agent indicating each digit of a telephone number on a communications device of some form.

Number—a telephone number.

Obsolete Number/Relinquished Number—a number that was previously associated with an individual, wherein calls to that number would reach the individual, but wherein the number is no longer associated with that individual due to various reasons, including, for example, the number being disconnected for termination of service.

Predictively Dialed (also, predictive dialing)—a dialing technique used by an ADS in a contact center wherein multiple calls may be initiated with the expectation that one or more of the calls will be answered and connected to agents.

Record—a collection of data in a database associated with a common aspect, in the context of a dialing list, a record may represent a collection of data for a particular individual or account.

Skip-trace Number—a number purported to be currently associated with a particular individual. In many instances, but not all, the individual may be a debtor who is not current with their debt payments. A skip-trace number implies that there is an obsolete number for the particular individual.

Telephone Device—any one of the various forms of telephony devices used by an agent in a contact center to communicate via voice, including a conventional telephone, dial pad, headset, and a soft-phone.

Service Concepts

A typical application of skip-trace numbers is in the debt-collection industry. A debt collector may have a telephone number of a debtor, but that number may be obsolete, e.g., it is no longer associated with the debtor. The telephone number may have been disconnected or reassigned, and calling the obsolete number will not reach the desired party. Using the number may result in the calling party hearing a disconnect announcement or reaching a different party if the number has been reassigned. The debtor may have relinquished their telephone number without informing the debt collector, and may have obtained a new telephone number, also without informing the debt collector. Thus, an obsolete or relinquished number is no longer useful for reaching the intended target party.

In some circumstances, the debt collector may enlist the services of a "skip-trace" vendor, who provides a purportedly current telephone number of the debtor. The debt collector may provide various identifying information regarding the debtor to the skip-trace vendor, including the name, personal identifying information, current or previous known residence, prior known telephone number, etc. This information may be used by the skip-trace vendor to confirm a current telephone number for the same individual.

In theory, the skip-trace vendor will either ascertain a current telephone number for the debtor and provide it to the debt collector, or inform the debt collector that a current telephone number cannot be found. In practice, the skip-trace vendor may occasionally provide the debt collector with an incorrect number. For example, the number may correspond to a different individual with the same name or that number may have been associated with the correct individual at one time, but has since been reassigned to someone else. Further, given the prevalence of mobile phones, it is frequently the case that the skip-trace number is a wireless number. For example, the debtor may be using a pre-paid cell phone, which may have been allocated a new number when it is purchased.

The debt-collector may add the skip-trace number to their dialing list which is then processed using an ADS that uses an automated dialing technique of some form, although the ADS may or may not be considered an "autodialer" as defined by the TCPA. That is to say that although the TCPA includes a definition of an "autodialer", that term has been variously interpreted by district and state courts, as well as by the Federal Communication Commission's regulations. These interpretations, sometime inconsistent with each other, has led to confusion on whether a particular implementation of an ADS is considered an "autodialer" under the TCPA.

An ADS usually manages compliance with various commonly known requirements that contact centers must abide with, such as ensuring compliance with calling windows. Calling windows are the times during the day in which certain types of calls are allowed to originate. In addition, an ADS may also perform various management and other related functions to ensure the contact center operator is operating efficiently. Further, the ADS typically handles a plurality of agents engaged in an outbound campaign. An outbound campaign can be described as a common purpose for placing a plurality of calls. For example, an outbound calling campaign may be to solicit orders. Finally, it is helpful to also indicate what an ADS is not. A mobile device which is designed to accommodate a single user (e.g., a cell phone, smart phone, or cellular equipped tablet) is not an ADS.

Using an ADS to dial a wireless skip-trace number may present a potential liability for the debt-collector. If the skip-trace number is incorrect (e.g., it is not associated with the intended individual), then the party reached most likely did not provide prior express consent to be called using an ADS. If the ADS is considered an autodialer and the skip-trace number is a wireless number, then a potential violation of the TCPA may have occurred.

Another situation where liability may accrue to the debt-collector using a contact center is when the skip-trace number is a wireless number that is associated with the intended party, but the party did not provide consent to be called on that particular wireless number. Specifically, the party may have previously provided express consent to be called on a different wireless number. Potentially, this may also be a TCPA violation for dialing a wireless number for which consent was not previously provided.

It is not entirely clear from current regulations whether the debtor's prior consent to be called on a previous number carries forward to a new wireless number or applies to another wireless number used or controlled by the debtor. For example, a person may have two cellular phones, where one is associated with their work and one is personal. The person may provide consent to be reached on one number (their personal number), but not on the other number (their work number). Or, the person may have provided limited consent, or consent for a limited time.

Thus, to minimize liability, the debt-collector should manually dial a skip-trace number, particularly if it is a wireless number, until the debt-collector has confirmed it is appropriate to use an ADS to dial the skip-trace number. This may involve confirming whether the skip-trace number is truly associated with the debtor, whether the skip-trace number is a wireless number, and/or whether the debtor has provided consent to be called on that number. Until such confirmation has occurred, the skip-trace number should not be dialed using an ADS, but should be manually dialed, such as described in the aforementioned U.S. patent applications.

The example used herein refers to a debt-collector initiating a call to the debtor, and it is possible that the debt-collector may contract with a contact center to originate the calls, or the debt-collector may actually operate the contact center. Reference to a debt-collector should therefore be understood to encompass either case as well as other variations. Consequently, the terms "debt-collector" and "contact center" may be used interchangeably in certain contexts in the examples provided herein, but these terms are intended to be distinct when used in the claim language.

The contact center will typically dial a set of telephone numbers in a dialing list in order to attempt to contact debtors. The dialing list largely contains numbers which are presumed to be current (e.g., which are not obsolete). However, it is possible that at any given time any one of the numbers may be discovered to be obsolete after dialing it. This may necessitate obtaining a skip-trace number from a skip-trace vendor and using that instead of the obsolete number. Frequently, the debt-collector may retain the old number since it may have value in identifying a current, valid number of the debtor. The skip-trace vendor typically will use the old number and other information to ascertain a current number for the individual.

There are disclosed herein two different ways in which the contact center can proceed upon encountering an obsolete number, and a number of variations thereupon may be employed, as will be seen. These involve using a single or dual dialing lists (the latter may also be referred to as multiple dialing lists). The different ways in which these dialing lists can be processed correlate to various embodiments as to how the contact center may minimize liability under the TCPA. One goal for the contact center is to avoid using an autodialer to dial a wireless skip-trace number until the skip-trace number has been confirmed as appropriate to use with an autodialer, which is a particular form of an ADS. This may involve confirming that the number is associated with the target individual, confirming that the individual's consent is obtained, and/or confirming that the number is a wireless number. Thus, an "unconfirmed" wireless skip-trace number may refer to a wireless number that has not been confirmed. A "confirmed" skip-trace number is one that has been at least confirmed as being associated with the debtor. In certain embodiments, a "confirmed" skip-trace number is confirmed as being a number associated with the debtor and also a number for which consent exists to use an ADS to dial it.

Determining the Need to Obtain a Skip-Trace Number

A contact center operator may initially use a dialing list where all the numbers are presumably current, associated with debtors, and for which consent has been previously obtained. At some point during the use of the dialing list, it can be expected that a number assumed to be valid is found to be actually obsolete. Upon discovering the number is obsolete, the contact center may obtain a skip-trace number. This could be done in real-time, or in a batch mode. The skip-trace number is then obtained from a skip-trace vendor, and maintained in some distinct manner until it is confirmed, thereby allowing the skip-trace number to be used by the ADS. Confirmation typically involves placing a manual call to the number and obtaining verbal confirmation.

In one embodiment, the skip-trace number could be added back into the original dialing list, provided it is differentiated in some manner, or the skip-trace number could be added into a separate list that is differentiated and is then used for manual dialing. Consequently, at a high level, the contact center may maintain a single integrated dialing list or separate (dual or multiple) dialing lists. The single list may contain both confirmed and unconfirmed skip-trace numbers, and if so, it may be referred to as an "integrated" dialing list. Even if the dialing list does not necessarily have an unconfirmed skip-trace number, but the record structure is designed to have one, then the dialing list may be referred to as an integrated dialing list.

Turning to FIG. 1, the process 100 illustrates a contact center initially using a (single) dialing list of numbers in operation 105 which is processed to detect obsolete numbers. The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer numbers of operations may be performed than shown in the figures and described herein. These operations may also be performed in a different order than those described herein.

Returning back to FIG. 1, at the point of time when the process begins, this initial list of numbers is presumed to only include current (non-obsolete) numbers. In the first operation, a record from the dialing list is selected and a number in that record is used by a dialer, which may be an ADS. The number is then dialed and a call is initiated to the individual.

The record in a dialing list may actually contain several numbers associated with the same individual (e.g., home number, work number, mobile number, etc.), but for purposes of illustration, a single number is selected for purposes of originating a call to the individual. The record format may also include numerous fields, including information about the debtor, various contact related information, prior contact details, etc.

At this point, at operation 110, at least two different possibilities exist with respect to the originated call. In operation 115, the call is answered. Assuming for sake of illustration that a live person answers the call, the answering party in operation 120 converses with the agent connected to that call. Assuming that the dialed number is obsolete, the answering party informs the agent that the number has been reassigned, e.g., that the number is not associated with the intended party (the debtor). This is usually established quickly when the agent attempts to speak with the intended party (e.g., "Is Mr. Smith there?").

In response, the agent who may be using a workstation as described in the aforementioned patent/patent applications may indicate a disposition code or other information in operation 125 that informs the ADS that the number is no longer current and is obsolete (e.g., it is no longer associated with the intended called party). At this point, the ADS knows that the number is obsolete.

Alternatively, returning back to operation 110, the call may reach an intercept announcement in operation 130. This announcement may be provided by the telecommunications service provider handling the call to indicate that the number dialed is no longer in service, has been disconnected, or has been changed. These announcements are frequently preceded by a defined set of three tones so that the calling equipment can automatically detect the condition. This equipment may utilize digital signal processors to detect the presence of such tones. Different tones and announcements may be used to represent different conditions, which may all correlate to the number being obsolete. In this case, upon detecting an appropriate intercept announcement, the ADS knows the number is no longer associated with the called party and therefore is obsolete.

As a result of either the agent reporting or the ADS detecting the number is obsolete, the record in the dialing list is updated by the ADS in operation 135. This may be accomplished, for example, by updating a field in the currently used record indicating that number is no longer current. Again, the exact format and number of fields used in the record to indicate this and any other condition may vary from embodiment to embodiment.

The next operation illustrated involves obtaining a skip-trace number. This may be accomplished by the ADS querying a skip-trace vendor for a skip-trace number in operation 140. This may occur in real-time relative to detecting the number is obsolete. For example, an agent may invoke a function on their workstation that initiates the query to the skip-trace vendor. Typically, the query is launched prior to processing the next number in the dialing list. The ADS may use information associated with the record for the obsolete number in formulating the query to the skip-trace vendor.

The skip-trace vendor may return one or more numbers, and may further indicate additional information associated with a number. The additional information may indicate whether the number is known to be a wireline or wireless number, whether it is part of a do-not-call database, a date when the number was last known to be valid, etc. In addition, the skip-trace vendor may provide a confidence score associated with a number that is used to indicate its relative confidence as being correct. If multiple numbers are returned, they can be both added to a manual dialing list or only the number with the higher (or highest) score is added. Further, depending on the embodiment, the number may be added to a particular type of list (e.g., a predictive or manual dialing list) based on an indication of the type of number. For example, a skip-trace number indicated as wireline may be added to the predictive dialing list, whereas a skip-trace number indicated as wireless may be added to the manual dialing list. If no indication is provided, the number may be treated as being wireless until the type of number is ascertained or confirmed. There are also third party vendors known to those skilled in the art that can receive and respond to a query to indicate whether a number is a wireless or wireline number. These vendors may be used to confirm the type of number if the desired.

In addition, the confidence score value may be used to ascertain how to process the number. For example, if the skip-trace number is scored at 100% as being a current wireline-based number for a debtor, the skip-trace number may be treated as "confirmed." Thus, the number may not be placed in the manual dialing list for confirmation, but presumed to be acceptable to include in the manual dialing list. On the other hand, a threshold may be defined so that any number with a certain score (e.g., 75% or less) is treated as an unconfirmed number. Such a number would be included in a manual dialing list until it is confirmed. The exact threshold used to determine how the number should be processed may vary according to the risk level desired by the contact center operator.

In another embodiment, the ADS may maintain a list of all obsolete numbers and submit a batch skip-trace query periodically. For example, a request for updated numbers may be submitted to the skip-trace vendor after the dialing list has been processed for the day. In various embodiments, related information of the debtor may be conveyed along with the obsolete telephone number, to allow the skip-trace vendor to confirm the current number. Other variations are possible. In the latter case, the records warranting a skip-trace query may be cached until the processing of the dialing list is completed, until the completion of a shift, or some other time period.

The received skip-trace number(s) may be processed in one of several ways. Two such approaches are shown at the junction point 145. In one embodiment, the skip-trace numbers are integrated into the original dialing list in operation 150. This may involve, for example, adding the skip trace number back into the appropriate record with appropriate indicators reflecting that it is an unconfirmed skip-trace number. This embodiment requires that the record structure have the appropriate fields or indicators to reflect this. As will be seen, the original dialing list could be modified in order to create an integrated dialing list, or the original dialing list could already have such a record structure, so that no changes to the record structure are required. In the latter case, the original dialing list is essentially structured as an integrated list, even though the original dialing list may not have contained any obsolete numbers.

In another embodiment reflected by the process flow continuing from operation 145 to operation 155, the skip-trace number may be added to a separate skip-trace dialing list, which is associated with the dialing list. This separate list may only contain the skip-trace numbers obtained from querying the skip-trace vendor. In this case, it may be presumed that each of the numbers in the separate skip-trace dialing list is unconfirmed.

The above flow of FIG. 1 represents a single pass through the dialing list. The overall process may be repeated numerous times for a given list as each record is processed, though the looping process is not shown. In essence, each time the ADS dials a given number, it is possible for that number to have been relinquished, and thus discovered as obsolete at any given time. Thus, being able to detect an obsolete number is required each time a record in a list is processed.

In summary, the above flow illustrates one embodiment of how a contact center may process a dialing list and ascertain the need to obtain a skip-trace number. Further, the contact center may maintain the skip-trace numbers in different ways, including by integrating the results into a single list or adding the results to a separate list. Other variations on these procedures are possible. Regardless of the approach, there must be either an implicit or explicit indication that the skip-trace numbers obtained have not been confirmed, and thus, an autodialer should not be used to dial these numbers until they are confirmed. To recap, when the skip-trace number is incorporated into a single list, a field in the record is modified to distinguish this number from others in the list. If the original dialing list did not have this field, then the dialing list must be updated to add this field. If the original dialing list did have this field, then the same structure of the original dialing list may be used. When the skip-trace number is incorporated into a separate list, that separate list itself may distinguish the skip-trace number from those in the original list.

Single and Dual Dialing Lists

Figure 2:
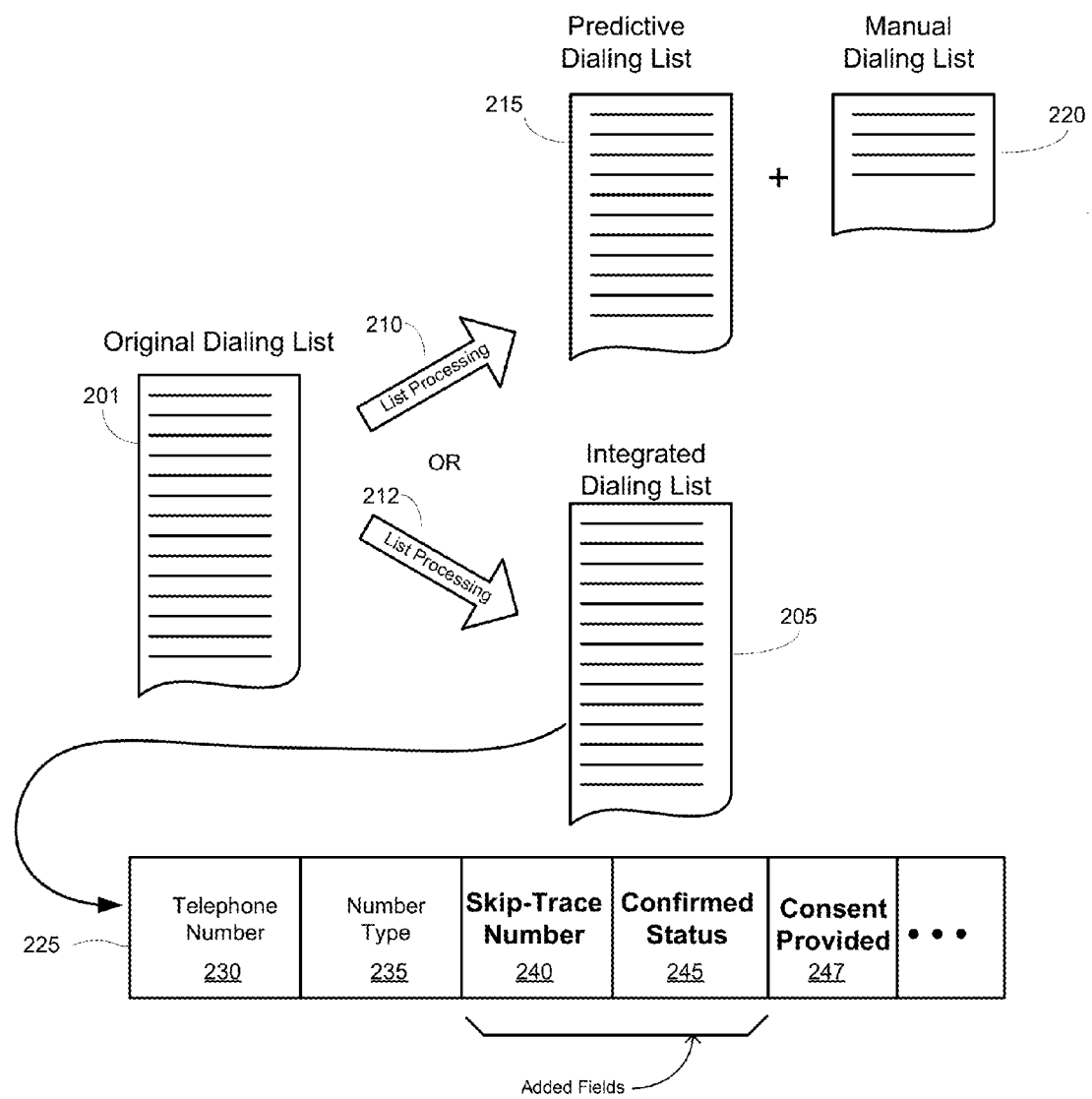
FIG. 2 illustrates at a high level the concept of segregating an integrated dialing list that includes skip-trace numbers into two separate dialing lists.

Turning next to FIG. 2, the concepts of a using either a single integrated list or two separate lists are illustrated. Recall that in FIG. 1, the process flow illustrated a contact center starting with an initial dialing list and processing it. Upon discovering an obsolete number, the ADS may either 1) update the original list to form the integrated dialing list or 2) generate a separate skip-trace dialing list in addition to the original dialing list.

This is illustrated in FIG. 2 by first focusing on the original dialing list 201 which is the list initially processed by the contact center. Upon encountering an obsolete number, the contact center may proceed in one of two ways. The first approach, represented by arrow 210, results in producing two dialing lists, the predictive dialing list 215 and a manual dialing list 220. The predictive dialing list contains records which are "safe" to dial using an autodialer and the manual dialing list 220 contains records of numbers that should be manually dialed. In one embodiment, the records which are obsolete are removed from the original dialing list thereby resulting in transforming the original dialing list into the predictive dialing list.

In other embodiments, such records with obsolete number are merely flagged as such in the dialing list, and thus may be retained in the original dialing list. However, to do so usually requires modifying the record structure or the original dialing list (or starting with the required record structure), and if this is required, then the other type of processing shown in FIG. 2 may be performed. This is essentially reflected by the other type of processing indicated by arrow 212 which results in processing the original dialing list 201 thereby generating an integrated dialing list 205. In this case, the obsolete numbers are present, but are distinguishable as such in the dialing list.

In order to distinguish the newly added skip-trace numbers in the integrated dialing list 205, a record structure 225 as shown may be used. The record structure may include fields that indicate one or more telephone numbers 230, a corresponding number type 235 (e.g., wireline or wireless), and whether consent has been provided 247. In addition, there may be two other fields present. First, the "skip-trace number" field 240 may be a flag or other form of indicator that indicates whether the telephone number 230 is a skip-trace number. Typically, a record will indicate several telephone numbers for a debtor, so the record structure 225 is simplified for purposes of illustrating the inventive concepts applied to a single number in the record. In addition, another field is shown which is the "confirmed status" field 245. This field indicates whether a confirmation of the telephone number 230 has occurred. Typically, this occurs when the agent converses with the called party, and confirms that the number is correct. Confirmation may also involve confirming whether the number is a wireless number, which may or may not replace or augment the "number type" field 235. As noted earlier "confirmation" may mean one or more of several types of confirmations. It is a design choice as to whether a single field indicating a particular meaning of "confirmed" is used versus a number of various fields/values to indicate various combinations of confirmation. Thus, other embodiments may have separate indicators for indicating the number is associated with the target party and whether the target party verbally or otherwise provided consent for using this number.

It is also possible for the ADS to process an integrated dialing list prior to dialing by processing the list as depicted by arrow 210 to generate the two lists—a predictive dialing list 215 and a manual dialing list 220. Thereafter, the ADS may process these two dialing lists, updating each as appropriate. At the end of the processing of such lists, the two dialing lists could be merged into one, or maintained separately.

Alternatively, the ADS can start dialing numbers from the original dialing list and produce the integrated dialing list as depicted by arrow 212. If there is no obsolete number detected, then no skip-trace number is added. However, assuming that at least one obsolete number is detected, then a skip-trace number will be obtained and added back into the list thereby producing the integrated dialing list. Thereafter, the contact center may simply work with the integrated dialing list. The above illustrates that even if the contact center starts with an original dialing list without obsolete numbers, it may process either a single integrated dialing list or separate lists.

The record format for the integrated dialing list typically requires a modification to the record structure relative to that of the original dialing list. However, adding fields to the record structure in a database is a well known process, so that the desired structure could be created as desired initially. On the other hand, the record format for the predictive dialing list 215 may be the same as the original dialing list and therefore does not require modification of the database by the processing in the dialer. The manual dialing list 220 may have the same or different structure. Thus, there are relative advantages to using the two different processing approaches which may or may not involve altering the basic record structure in the dialing list to add the indicators reflecting a skip-trace number 240 and a confirmed status 245.

Hybrid Approaches

Other variations are possible, which meld portions of both the single and dual list approaches. A contact center may dial numbers in the original dialing list and discover obsolete numbers. This may be reflected by altering the fields in the appropriate records in the original dialing list. Later, skip-trace numbers may be obtained and added back into the original dialing list thereby producing the integrated dialing list. However, before reattempting to dial the numbers on the integrated dialing list, the skip-trace records are removed to produce two separate lists. As a result, the integrated list then only contains numbers that can be safely dialed by the ADS, whereas the manual dialing list contains numbers that are dialed manually.

Figure 3:
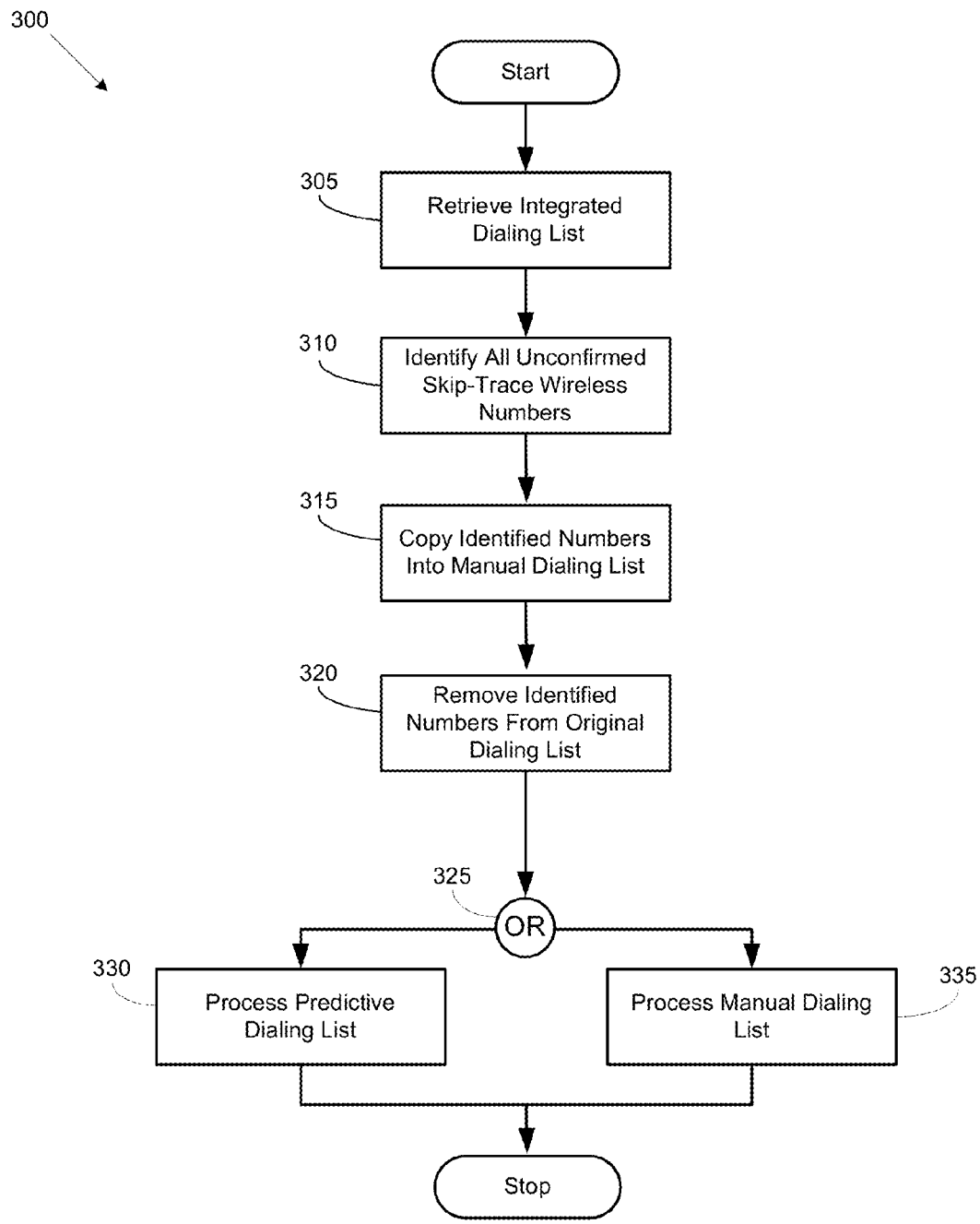
FIG. 3 illustrates one embodiment of a process flow for processing the integrated dialing list to produce the two separate dialing lists and then using the dialing lists.

This process is reflected in the process flow 300 shown in FIG. 3. The process flow 300 begins with retrieving the integrated dialing list in operation 305. Next, all unconfirmed skip-trace numbers are identified in the list in operation 310. Next, these numbers are copied into a separate manual dialing list in operation 315 and are then removed or flagged to be skipped during processing of the integrated dialing list in operation 320. Then, at junction 325 the ADS may opt to process the predictive dialing list in operation 330 and/or the manual dialing list in operation 335. These two dialing lists could be processed serially or in parallel.

Those skilled in the art will be able to devise variations on the process flow 300. This is because some contact centers may pre-process a dialing list before loading each respective dialing list into processing components, whereas other contact centers may use an ADS that integrates this processing as part of the dialing process. At a high level, in this embodiment, the process flow indicates that all unconfirmed wireless skip-trace numbers are indentified, copied, and removed. In other embodiments, this could occur in a looping manner by processing each number on a record-by-record basis. Further, it is not always necessary to actually remove the unconfirmed numbers from the predictive dialing list. It is possible to set a flag which effectively removes that record from processing by the ADS in that the flag indicates the record should be skipped, resulting in a similar outcome as if that record were removed. Other variations are possible while adhering to the principles and concepts disclosed herein.

Figure 4:
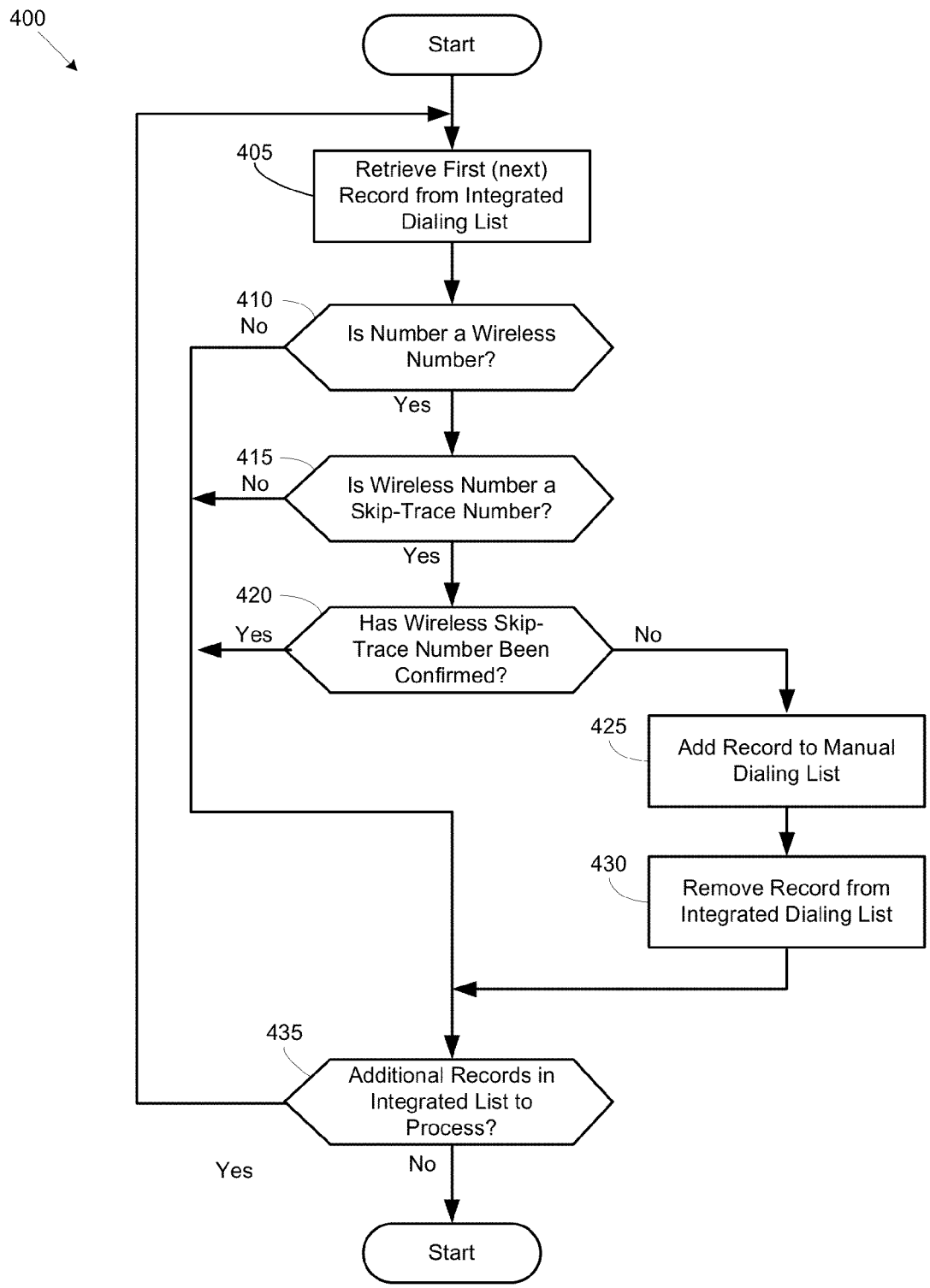
FIG. 4 illustrates one embodiment of a process flow for processing a dialing list comprising a skip-trace number.

A variation of this process is shown in FIG. 4. Turning to FIG. 4, the process 400 illustrates processing records from the integrated dialing list 215. The process begins with retrieving the initial or next record from the integrated dialing list in operation 405. Various fields in the record are examined, and the order in which the fields may be processed may vary. In this embodiment, the first field examined indicates whether the number is a wireless number in operation 410. If the answer is "no," then the number must be a wireline number, and the number can be retained in the integrated dialing list. The process proceeds to operation 435 where a test determines if there are additional numbers to process in the list.

Assuming that from operation 410 the number is a wireless number, the next test is to determine whether the wireless number is a skip-trace number in operation 415. If the answer is "no," then the number can be retained in the list. (It is presumed that such wireless numbers have express consent to be dialed, and therefore may be retained in the predictive dialing list.) If the number is a skip-trace number in operation 415, the next test is to determine if the wireless skip-trace number is indicated as having been confirmed in operation 420. If "yes", the record may be retained. If "no", then the record is added to the manual dialing list in operation 425 and removed from the integrated dialing list in operation 430. The process continues to operation 435 where another test determines if there are additional records to process. Once completed, the integrated dialing list is transformed into a predictive dialing list and the other list created is the manual dialing list.

Once the predictive dialing list is formed as described above, it may be processed by an ADS, such as a predictive dialer. If there are any wireless numbers present in the list at this point, it may be presumed that consent exists to call the individual using the ADS. (If consent were not present, then such numbers should be moved over to the manual dialing list or should be skipped by the ADS.)

The ADS can then process the predictive dialing list as known to those skilled in the art. This processing involves dialing the various numbers in the list, and it can be appreciated that at any given time, an individual associated with a number in that list may have relinquished their telephone number. Thus, each time the predictive dialing list is processed by the ADS, the ADS must be prepared to encounter a number that is no longer associated with the intended called party, and update the list accordingly. (Similarly, the components used in manual dialing a list must also be prepared to update the manual dialing list if an obsolete number is encountered). When this happens, the predictive dialer list can then be viewed as essentially being an integrated dialing list. In other words, each time an integrated dialing list is processed by a dialer for originating calls, unconfirmed skip-trace numbers may be added resulting in converting the predictive dialing list back into an integrated dialing list. In fact, this could occur when processing the very first number in the list.

In summary, there are a variety of records structures and corresponding dialing lists that can be used in a contact center that involve skip-trace numbers. Regardless of the specific record structure and number of lists used, the ADS must be able to process a detected obsolete number, obtain a corresponding skip-trace number, and process the unconfirmed skip-trace number differently (e.g., using manual dialing procedures). Once the skip-trace number is confirmed, then it can be dialed using an autodialer.

Dual List Dialing Architecture

Whether a single or dual dialing list scheme is used may impact (or depend on) the contact center architecture used to process the dialing list(s). An architecture for handling dual dialing lists may incorporate two sets of components: one set of components for processing the predictive dialing list (referred to as a "predictive dialing sub-system," which is a type of ADS) and another set of components for processing the manual dialing list (which may be referred to as a "manual dialing compliance sub-system" but which is not an ADS).

Figure 5:
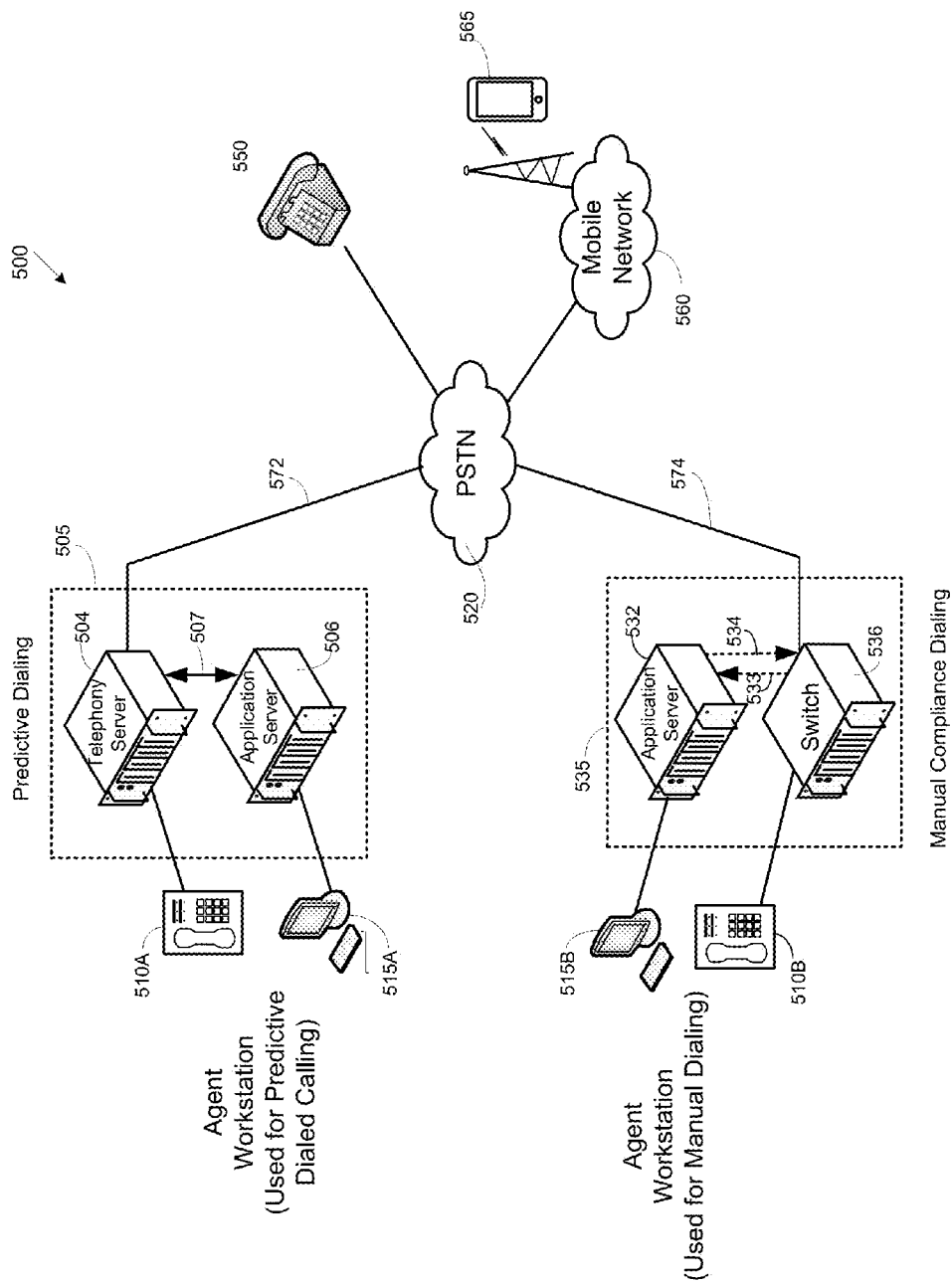
FIG. 5 illustrates one embodiment of an architecture in a contact center for processing two dialing lists, namely a first dialing list comprising confirmed skip-trace numbers and a second dialing list comprising unconfirmed skip-trace numbers.

One such architecture 500 is shown in FIG. 5. In this figure, a contact center may comprise an ADS comprising components used for predictive dialing, which include an agent workstation comprising a telephone 510A and an agent computer 515A, and a predictive dialing sub-system 505. The predictive dialing sub-system may comprise a telephony server 504 operating in communication 507 with an application server 506. The operation of the predictive dialing sub-system 505 may be as known in the prior art. In one embodiment, the application server processes a predictive dialing list, performing the variously well known predictive dialing functions, and instructs the telephony server 504 to place calls as appropriate. Upon one of the calls being answered, the application server may present account information to the agent on the agent's computer 515A associated with the call connected to the agent via telephone 510A.

The calls are established over facilities 572 to the PSTN 520, which may connect to a wireline telephone 550. The call may also be established to a mobile network operator 560, which routes the calls to a mobile phone 565. It is assumed that calls originating from the predictive dialer sub-system 505 to a mobile phone have the express consent of the user of the mobile phone. Although shown as using conventional PSTN type facilities, in other embodiments IP based facilities may be used, and the telephony server could be, e.g., a SIP server. Other variations are possible as known to those in the art.

The contact center may also employ a manual dialing compliance sub-system 535, which processes the manual dialing list for unconfirmed wireless skip-trace numbers. The manual compliance dialing sub-system 535 may be used for dialing other wireless numbers (e.g., non skip-trace numbers) for which consent is not obtained. The manual compliance dialing system 535 may comprise an application server 532 which is in communication with a switch 536. The application server 532 is connected to an agent's computer 515B and the switch 536 is connected to an agent's telephone 510B. In certain embodiments, the switch 536 may be a private branch exchange ("PBX") or similar type of switching device. It is not necessary that all the functionality of a conventional PBX be present in switch 536, but a PBX represents equipment that is often readily available in a contact center that can be adapted to communicate with the application server 535 as required and provide the required functionality of the switch 536. The required functionality of the switch 536 may include capabilities necessary to perform the steps described below that illustrate one embodiment of how manual dialing may occur. Specifically, the switch is required to send a message indicating the call that the agent has dialed, and potentially receive and act upon a response command from the application server.

In the first step, the application server 532 accesses the manual dialing list stored in its memory (which may have been retrieved from a database) and displays that number to the agent using the agent's computer 515B. In one embodiment, this number will be the unconfirmed wireless skip-trace number. The agent views the computer screen and then uses the telephone 510B to dial the displayed number. The call request is processed by the switch 536 and the switch initiates a message 533 to the application server 532 indicating which agent (e.g., originating station telephone number) that originated the request and the number the agent dialed (e.g., the called party number). The application server 532 compares this to the number it had just presented to the agent's computer 515B. In this way, the application server 532 knows if the agent actually dialed the number just presented to the agent. The application server 532 may authorize or confirm the information to the switch 536 via a response message 534. The switch then initiates the call over facilities 574 to the PSTN, where the call continues to the mobile network 560 and then to the mobile phone 565. In this manner, the switch 536 establishes a call to an unconfirmed wireless skip-trace number. It is possible that SIP and VoIP based technology could be used.

In this embodiment, the application server 532 is not used to establish the call, although it is informed of the presence of the call. The application server 532 may merely acknowledge the receipt of the information from the switch, or the application server 532 may authorize the switch to proceed. Whether the application server confirms receipt of the information or authorizes the call to continue allows the application server to block or merely track misdialed numbers by the agent. Specifically, if the application server merely confirms receipt of the information, any number dialed by the agent may be allowed to proceed. However, the application server will know whether that number corresponds to the number expected to be dialed by the agent. If the application server authorizes the switch to proceed, then the application server controls whether a misdialed call (or a call to some other number) is allowed to proceed.

In this manner, the manual compliance dialing sub-system 535 may allow a call to be established from a manual dialing list without using an autodialer, but ensures that various other compliance requirements are adhered to. Additional details of the operation and options associated with the manual compliance dialing system 535 are described in the aforementioned patent/patent applications that are incorporated by reference.

The application server 506 in the predictive dialing sub-system 505 may share common functionality with the application server 532 in the manual compliance dialing sub-system 535. Both application servers may provide functionality for managing agents, recording calls, measuring agent performance and call parameters, and perform other functions commonly found in a contact center. Further, both application servers may perform call compliance functions. This includes, for example, ensuring that calls in the dialing list are originated within the allowable calling windows with respect to the called party. Other functions may involve handling of various conditions, such as busy, no answer, or an answering machine. Other functions may involve coordination with speech recognition systems, recording systems, scheduling systems, etc. However, the application server 506 used in the predictive dialing sub-system performs the various predictive dialing functions (or other automatic dialing techniques), whereas the application server 532 in the manual compliance dialing sub-system 535 does not. On the other hand, the application server 532 in the manual compliance dialing sub-system 535 interfaces with the switch 536 in a manner that is different from the application server 507 interfacing with the telephony server 504. However, because there is an overlap in functionality, the term "application server" is used in both instances, but it should be recognized that the functionality, while some of which is in common, is not exactly the same, and some functionality may be applicable to one sub-system but not the other.

At a high level, FIG. 5 illustrates how the two separate lists can be employed by a contact center. The predictive dialing list is employed by the predictive dialing sub-system 505 and the manual dialing list is employed by the manual compliance dialing sub-system 535. Each dialing sub-system 505, 536 can operate independently and simultaneously of each other. As the predictive dialing sub-system 505 processes the predictive dialing list, it may encounter relinquished numbers. As discussed above, these can be reflected back into the predictive dialing list or into a separate manual dialing list. Subsequent or real-time queries to a skip-trace vendor by the predictive dialing sub-system (or other component) may return a purportedly current skip-trace number, which can be added to the manual dialing list for dialing by the manual compliance dialing sub-system. This skip-trace number can be added in real-time or at periodic intervals. In some embodiments, the dialing lists are updated daily so that new skip-trace numbers identified by the predictive dialing sub-system during the day's processing can be added to the manual dialing list for manual dialing the next day.

When the manual compliance dialing sub-system processes the list, it can be expected that some numbers will be answered by the intended party, who will confirm with the agent that the dialed number is associated with them, and may also confirm that consent is provided to contact them using that number. Likewise, it can be expected that some numbers will not be answered by the intended party, will be indicated as obsolete, or that the right party will be reached but consent will not be provided. Once manually dialed numbers are "confirmed" as being acceptable to be used by the predictive dialing sub-system, they can be added back into the predictive dialing list. Manually dialed numbers that are determined to be obsolete may be removed from the manual dialing list.

Figure 6:
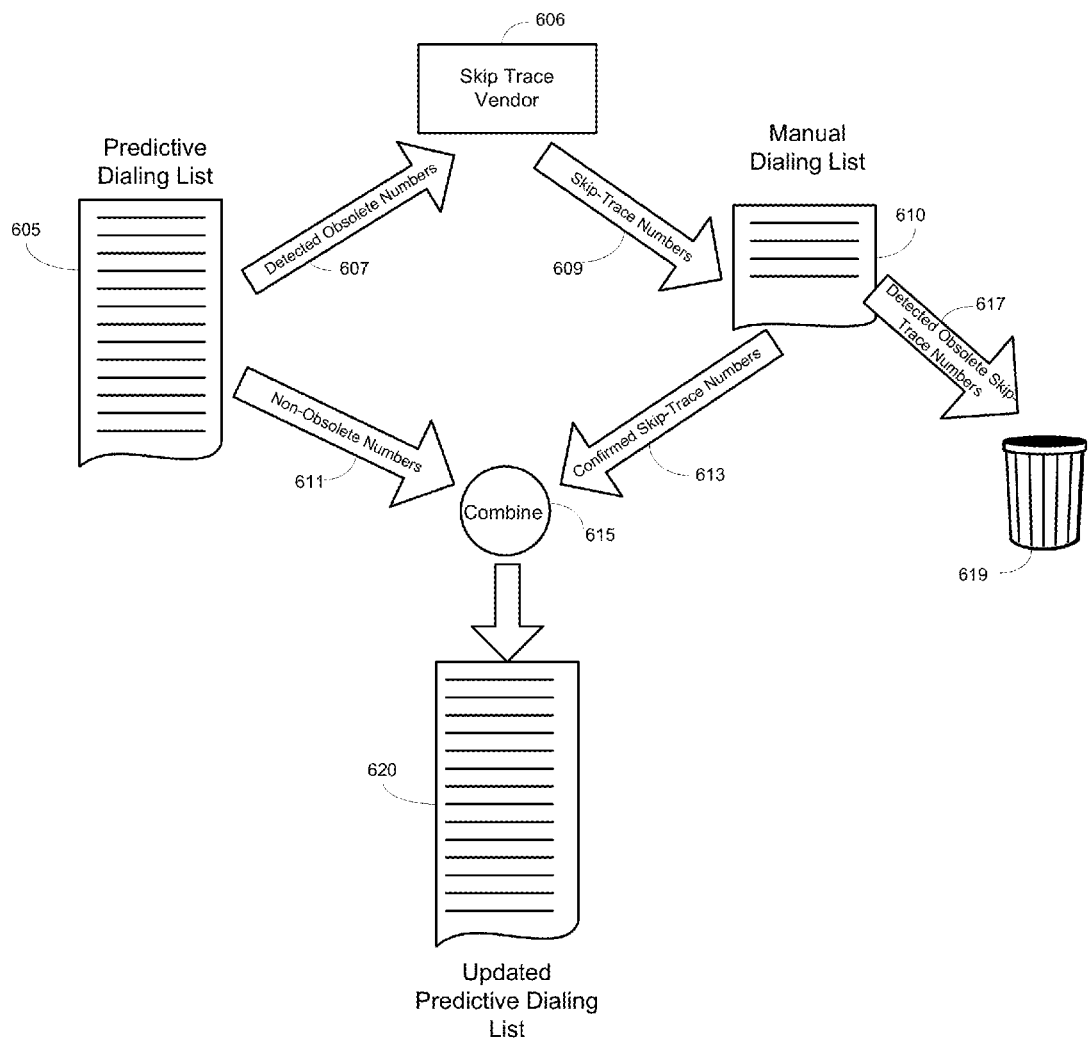
FIG. 6 illustrates one embodiment of a process flow for integrating a predictive dialing list with a manual dialing list to produce an updated predictive dialing list.

This overall process is graphically represented in the diagram of FIG. 6. Turning to FIG. 6, a representation of the types of processing that may occur using the two lists is shown. Starting with the predictive dialing list 605, this list is processed by the predictive dialer sub-system. During the course of processing, some numbers may be detected as obsolete, as represented by the arrow 607. These numbers are effectively removed from the predictive dialing list 605, and reported to a skip-trace vendor 606 to obtain replacement current numbers (e.g., skip-trace numbers). The skip-trace numbers are reported back to the contact center as represented by arrow 609, and are stored in the manual dialing list 610.

The manual dialing list 610 is also processed (though by the manual compliance dialing sub-system), and if any of the skip-trace numbers received are detected as obsolete, then they can be discarded as represented by arrow 617 directed to the garbage receptacle 619. (In some embodiments, these numbers may be retained and reported to the skip-trace vendor for receiving a credit as they were not actually correct, but in any case such numbers are not retained in the manual dialing list since repeatedly dialing the obsolete number is unproductive.)

After processing both the predictive dialing list 605 and the manual dialing list 610 (either simultaneously or serially), the results of the two lists may be merged. Specifically, as represented by the "combine" process 615, the non-obsolete numbers 611 from the predictive dialing list may be merged with the confirmed skip-trace numbers 613 from the manual dialing list to generate the updated predictive dialing list 620. Typically, only a subset of the numbers on the manual dialing list that are dialed during a time period are confirmed as current. Thus, only a subset of the manual dialing list numbers may be combined in operation 615. In summary, the obsolete numbers are removed from the predictive dialing list and confirmed skip-trace numbers are added back into the list. The updated predictive dialing list 620 can then be used as the predictive dialing list 605 for the next processing period.

The examples herein presume that the dialing lists are processed and updated daily or at the end of each shift, but that is more for purposes of illustration as it is possible that the time periods for processing and updating may occur more or less frequently, or in real-time (continuously).

Figure 7:
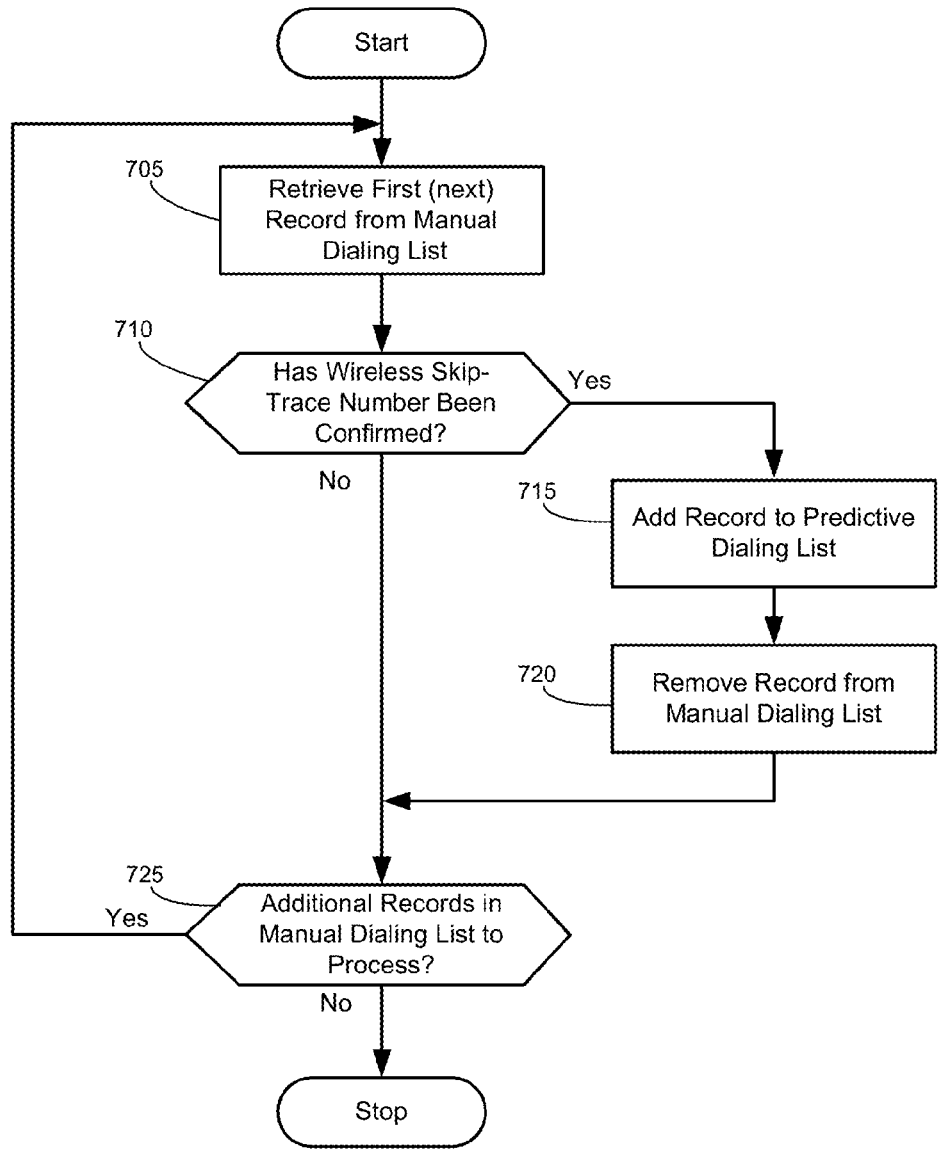
FIG. 7 illustrates one embodiment of a process flow for processing the updated predictive dialing list.

A process flow for the above mentioned "combine" processing function 615 is shown in FIG. 7. This process flow 700 begins by retrieving the first (or next) record from the manual dialing list after it has been processed in operation 705. If the flag indicates that the wireless skip-trace number has been confirmed in operation 710, then the number is added to the predictive dialing list in operation 715 and removed from the manual dialing list in operation 720. In effect, the record is 'moved' from the manual dialing list to the predictive dialing list because the number has been confirmed and can be dialed using an autodialer. The process then determines in operation 725 if there are any more records in the manual dialing list to process. If there are more records, then the process loops back to operation 705 where the next record is processed. Once all the records are processed in operation 725, the processing of the manual dialing list is completed.

At a subsequent point in time, the manual dialing list may be manually dialed again. As skip-trace numbers are confirmed, these skip-trace numbers are added back into the predictive dialing list and any further discovered obsolete numbers are removed. Consequently, it can be appreciated that the contents of each dialing list may change over time. New skip-trace numbers are added when encountered via dialing of the predictive dialing list, and confirmed skip-trace numbers are removed when they are confirmed and added back to the predictive dialing list. It can be appreciated that this may occur at different rates and may impact how frequently the manual dialing list is manually dialed.

Single Dialing List

The prior discussion revolved around the generation, maintenance, and use of two distinct dialing lists, which are processed by two distinct systems in the contact center: the predictive dialer sub-system and the manual compliance dialing sub-system. Another embodiment involves the generation, maintenance, and use of a single dialing list, which is processed by a hybrid arrangement of components used to accomplish predictive dialing and manual dialing.

Figure 8:
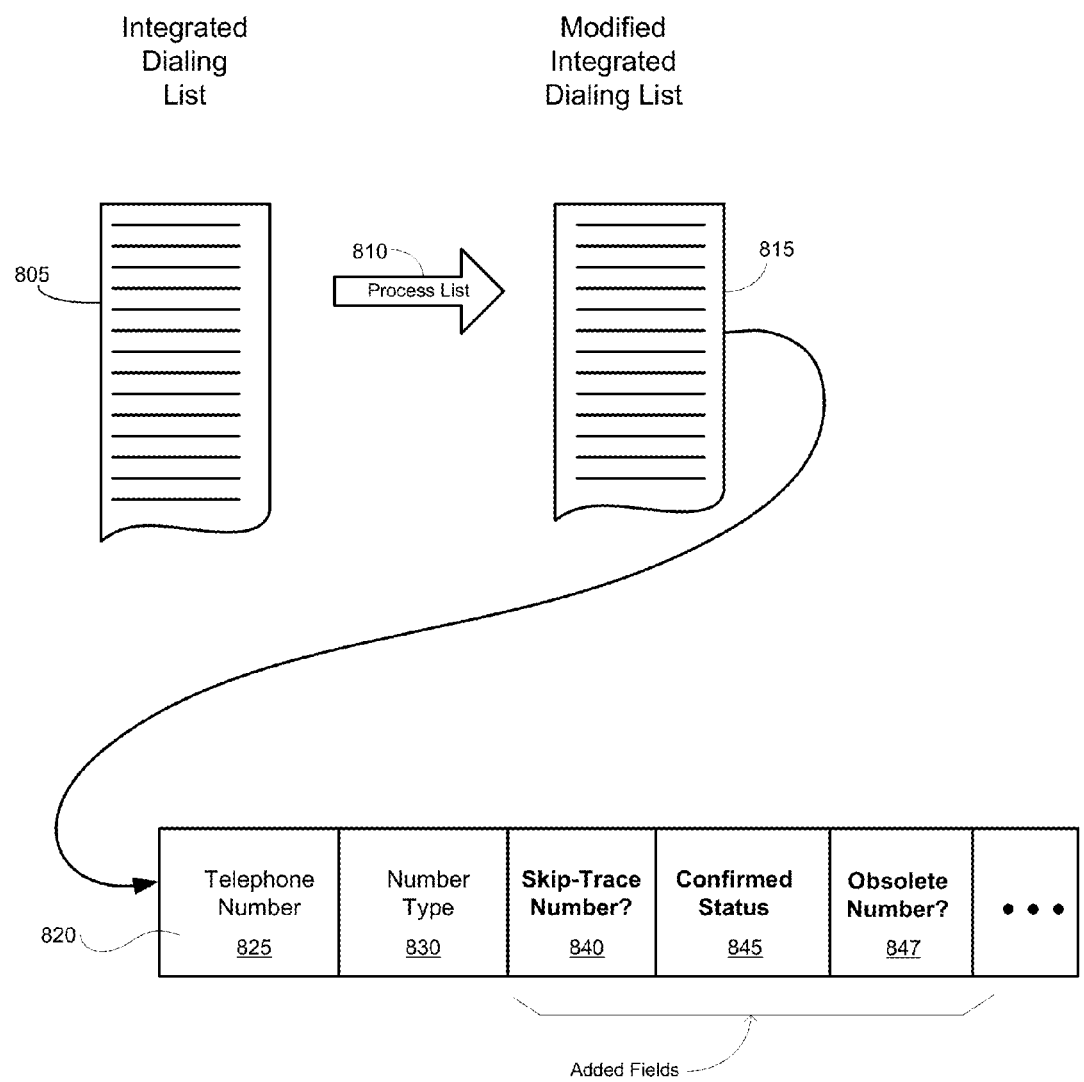
FIG. 8 illustrates one embodiment of the concept of modifying an integrated dialing list to accommodate both confirmed and unconfirmed wireless skip-trace numbers.

FIG. 8 illustrates the concept of using a single integrated list at a high level. Turning to FIG. 8, an integrated dialing list 805 is shown. This could be, e.g., an original dialing list before any relinquished numbers are detected that necessitated obtaining skip-trace numbers or can be a dialing list that has been previously processed and includes detected obsolete numbers and/or skip-trace numbers.

As the integrated dialing list 805 is processed by the dialer, any numbers deemed obsolete may be indicated as such. In addition, records that indicate a number is an unconfirmed skip-trace wireless number are dialed manually. As these numbers are confirmed, the records are updated to reflect such. Consequently, as processing 810 occurs, a modified (updated) integrated dialing list 815 is produced. This modified integrated dialing list 815 can be used as the integrated dialing list 805 at the beginning of the next day's processing.

Thus, the record structure 820 of the modified integrated dialing list 815 may include, e.g., a field indicating the telephone number 825 and an indication of its corresponding number type 830. Further, this record structure may also include fields indicating whether the number it is a skip-trace number 840, whether the number was confirmed or not 845, and whether the number is obsolete 847. In various embodiments, the names of these fields may be different. For example, the "obsolete" field 847 may be called "disconnected status" in other embodiments. The record may also include a "consent" field (not shown in FIG. 8) indicating whether consent was provided. Consequently, to the extent the original dialing record structure does not include these fields, these fields can be added to all the records in order to define the modified integrated dialing list. This structure is merely illustrative, as other record structures could be defined in the record structure for indicating this information. For example, a record structure could merely include an indicator that reflects that the corresponding telephone number should not be dialed with an ADS or manually dialed. More specifically, this could be a "dial-type" indicator that indicates whether the number can be dialed by an ADS or indicates how the number should be dialed (e.g., predictively, manually, etc.). In other words, the "dial-type" indicator (which may be called by another name) is used to determine the appropriate dialing procedure for the number—e.g., whether the number should be dialed by an ADS or manually. Using a single indicator may not necessarily reflect the reasons why the number should be dialed as indicated (e.g., there are a number of reasons why the number should not be dialed using an ADS), but this would be sufficient to indicate that the record should be skipped when processed by an ADS, and/or should be segregated for manual dialing. Then, when it is ascertain that the number can be processed by an ADS, the indicator can be set accordingly.

Initially, an integrated dialing list may not have any skip-trace numbers included. However, it can be expected that as the dialing list is processed, some numbers may be detected as being obsolete (e.g., relinquished). As discussed earlier, this may be detected by the presence of an intercept announcement or the agent being informed by the answering party. Once a number is identified as obsolete, the corresponding record is updated. Specifically, an indicator 847 may be set indicating the number is obsolete. Consequently, a skip-trace number that is indicated as both "confirmed" and "obsolete" means that the number was valid (e.g., confirmed) at one point in time, but subsequently it was discovered that the individual relinquished that skip-trace number, rendering it obsolete as well. In some instances a wireless subscriber may let their service temporarily lapse (e.g., late payment), but then revive their account. The service provider may allow the subscriber to retain their same number. Thus, it is possible for a wireless number to be taken out of service and then restored to the same subscriber shortly thereafter.

At some point in time, a skip-trace query can be made for this record (and similar obsolete numbers). If a skip-trace number is obtained, then the indicator 840 is set indicating that the number 825 is a skip-trace number. Since the skip-trace number is not confirmed, the confirmed status indicator 845 reflects that the number is unconfirmed. Once the skip-trace number is manually dialed and confirmed and consent has been obtained to dial it, then the confirmed status indicator 845 may be set as appropriate. Consequently, a single list with such a field structure can indicate the telephone number, its corresponding type (wireline or wireless), whether it is a skip-trace number, and its confirmation status. Collectively, this provides sufficient information to determine whether the telephone number should be dialed manually or via some other means, such as by the predictive dialing sub-system (or other form of ADS). Other fields may indicate whether express consent has been obtained for the particular number and the scope of the consent. For example, additional indicators may reflect whether consent exists for sending text calls, voices calls, or both. Further, consent may be qualified for certain subject matter. The indication of express consent and such additional indicators may be further used in determining how the number may be dialed depending on the purpose of the call.

Single List Dialing Processing

Figure 9:
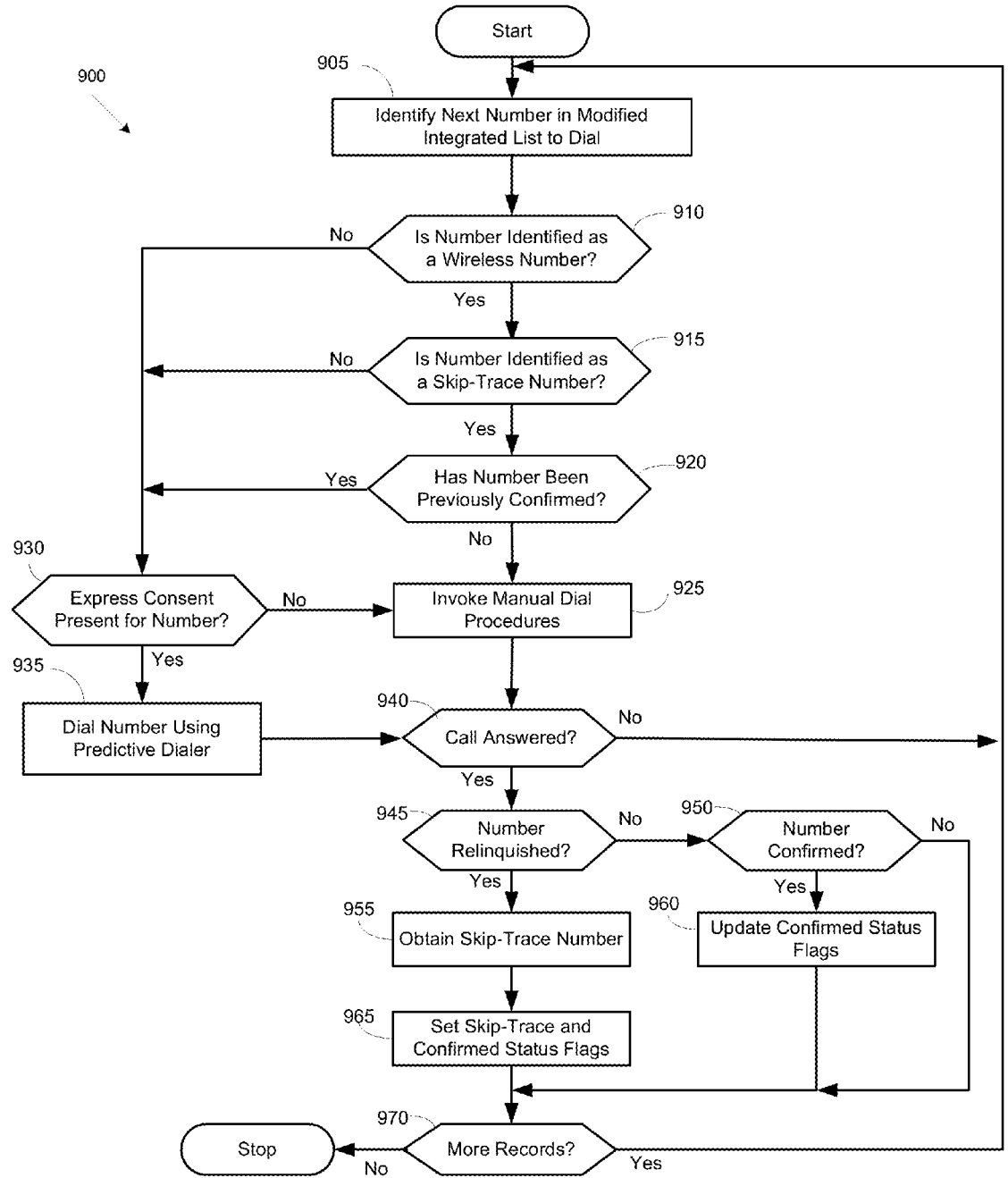
FIG. 9 illustrates one embodiment of a process flow of processing a dialing list.

The processing of a single integrated dialing list may utilize some of the various operations associated with processing of multiple dialing lists. Turning to FIG. 9, the process 900 begins with retrieving the initial (or next) record in the integrated dialing list in operation 905. The number indicated in this record is then analyzed in the context of other indicators in the same record. The order of the data analyzed may vary, but the process flow in FIG. 9 is sufficient to illustrate the concepts of one embodiment of how a record may be processed.

First, the number and its associated number type indicator are analyzed to determine if the number is a wireless number in operation 910. If the number is a wireline number, (as indicated by the "no" branch), then the process flow continues to determine whether express consent is present for the number in operation 930. Because the number has been determined to be wireline, various wireline-specific regulatory constraints may apply. Consequently, depending on various factors, it may be appropriate to determine whether express consent exists for dialing this number in operation 930. If no express consent exists, then the manual dialing procedures may be invoked in operation 925. If express consent exists for dialing the number using an ADS, then the predictive dialing procedures in operation 935 may be used.

Returning back to operation 910, if the number is identified as a wireless number, then the next test determines whether the number is a skip-trace number in operation 915. If not, then the number is a wireless number that is not a skip-trace number. In other words, the wireless number likely is known as being associated with the designated individual (e.g., it is a current number) and processing continues to operation 930. (It is possible that upon dialing the number, that the wireless number will be determined to be obsolete and a skip-trace number will be requested.)

If the number is a skip-trace number as indicated by the "yes" branch in operation 915, then the number is tested in operation 920 to determine whether the number has been previously confirmed. If the answer is "yes," then the flow continues to operation 930. Note that the test for express consent present in operation 930 may not be required, since it may be explicitly or implicitly inferred from the number having been confirmed. Thus, operation 930 may be optional in some embodiments.

If the number has not been confirmed in operation 920, then the number is an unconfirmed, wireless, skip-trace number. This number should not be dialed using the predictive dialing sub-system, but instead should be manually dialed. Hence, the process flows to operation 925 where the manual dialing procedures are invoked.

If the call is not answered in operation 940, then the process loops back to operation 905 to retrieve the next record. Not shown are various housekeeping details which may occur, such as incrementing a call attempt counter for that record, recording data of the time and outcome of the call, noting agent performance, etc. Further, for purposes of simplicity, procedures related to handling various other outcomes (e.g., an answering machine answering the calls) are not detailed. Rather, it is assumed that the call will either be answered by a live party or will encounter an intercept announcement indicating that the number is no longer in service.

If the call is answered, then a test is made to determine if the number is relinquished (obsolete) in operation 945. This may determined by the answering party indicating to the agent that the number has been reassigned from the prior individual or by detecting an intercept announcement indicating the number is no longer in service. If either occurs, then the process flow continues to operation 955 where the skip-trace number is obtained. Next, after receipt of the skip-trace number, the indicators for the skip-trace field and the confirmed status field are set appropriately in operation 965. Specifically, the received skip-trace number is indicated as being unconfirmed. If there are more records to process as determined in operation 970, then the process loops back to operation in 905.

Returning to operation 945, if the outcome is that the number is not relinquished (e.g., a "no" outcome), then the process flow may continue to determine whether the number is confirmed in operation 950 (this assumes that a live person has answered the call). Typically, this occurs by the agent verbally asking the answering party whether they are the intended target party, and/or whether they provide consent to use this number. If the answer is "yes", then the confirmed status field(s) in the record is set in operation 960. If the answer is "no", then the confirmed status field is not set and the process proceeds to determine if there are any more records to process in operation 970.

The process shown in FIG. 9 is not intended to detail all the operations associated with processing numbers in a dialing list, and simplifies various aspects thereof. FIG. 9 is intended to illustrate one embodiment for processing records using a single dialing list where obsolete numbers may be detected, including how to process skip-trace numbers that have/have not been confirmed, and how to set the appropriate indicators in the call record. Other embodiments may have more or less steps than shown. The process flow 900 illustrates that a wireless skip-trace number that has not been confirmed should not be predictively dialed, but should be manually dialed. Once that number is confirmed (and assuming that express consent exists), then that number can be safely dialed using a predictive dialer or some other automatic dialing technique. Of course, it is possible that after that number has been confirmed, that the number could then be subsequently relinquished and discovered to be obsolete, but this is true for any number.

Single List Contact Center Architecture

Figure 10A:
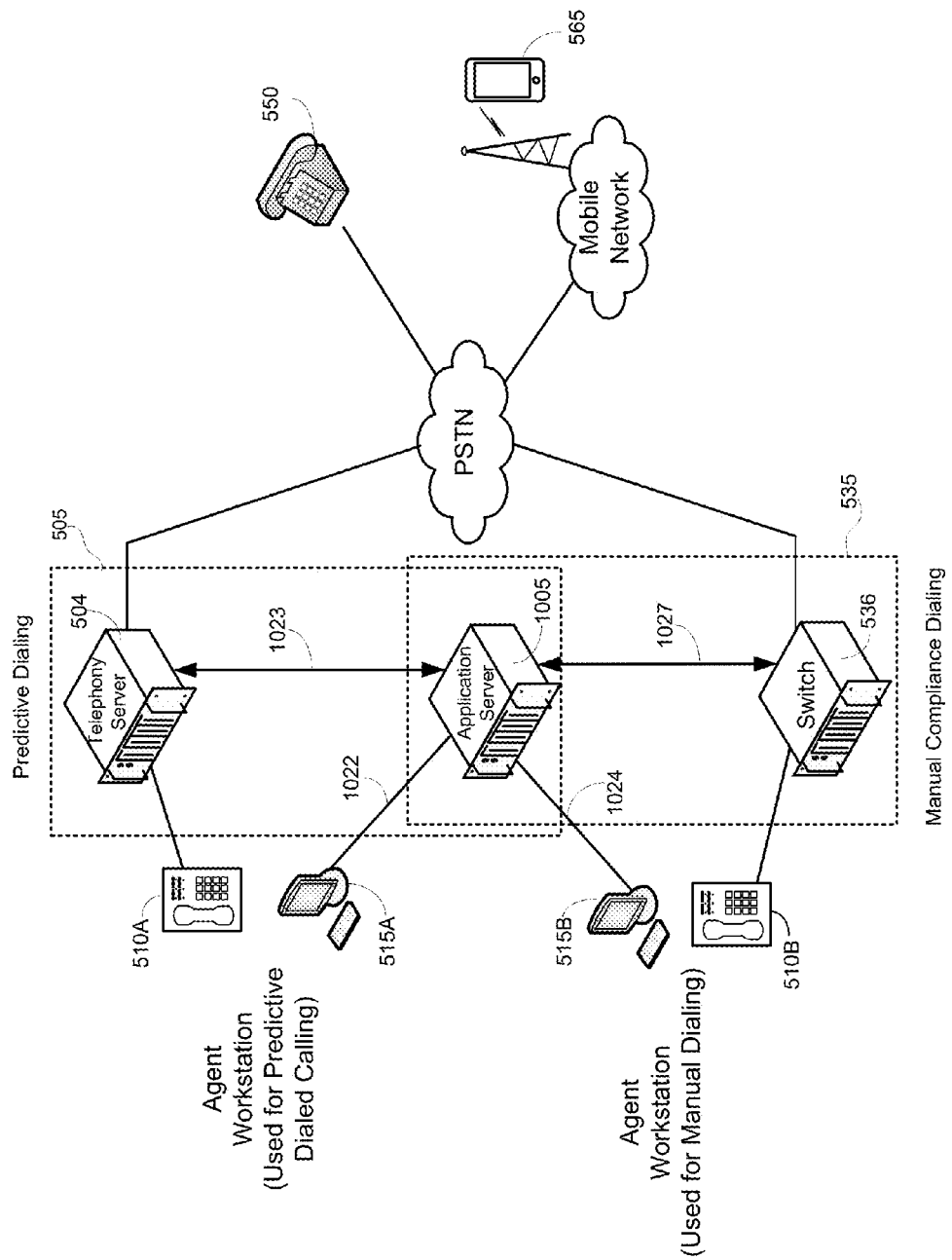
FIGS. 10A-10E illustrate various architectural embodiments of a contact center for dialing numbers using a single dialing list comprising both confirmed and unconfirmed wireless skip-trace numbers.

The contact center architecture for processing a single dialing list may be different from the contact center architecture for processing multiple dialing lists that was shown in FIG. 5. One such embodiment for processing a single dialing list is shown in FIG. 10A. One aspect of FIG. 10A that is different is that there is a single application server 1005 that provides functionality for both predictively dialed calls and manually dialed calls. In essence, a single application server is used for both the predictive dialing sub-system and the manual compliance dialing sub-system. In other words, the application server includes the functionality of both the application server 506 controlling the telephone server for predictively dialed calls and the application server 536 communicating with the switch for manually dialed calls. It should be appreciated that although this integrated application server includes this enhanced set of capabilities, different subsets are used for handling the predictively dialed calls and the manually dialed calls.

Predictive dialing is accomplished using the predictive dialing sub-system 505 which may comprise the telephony server 504 and the application server 1005. An agent uses telephone 510A which is connected to the telephony server 504 for handling voice communication. The same agent uses the computer 515A, but in this embodiment, the computer is connected to the application server 1005 via facilities 1022. The operation of these components cooperate to process the dialing list, which is maintained in the application server 1005, as described above.

In this embodiment, reference to the agent's "workstation" for predictive dialing may refer to the combination of the telephone 510A and computer 515A. These two physical devices may be co-located in a single work space location used by the agent. As will be seen, a variety of embodiments are possible that use various technologies for providing these functions associated with the computer and telephone.

The application server 1005 may select a number of records in the dialing list which are eligible for predictive dialing, and may instruct the telephony server 504 to dial the numbers as appropriate. Upon detecting one of the calls being answered, the telephone server communicates this information to the application server via link 1023, which then presents the appropriate account information on the computer 515A for the agent to view. The agent is then connected to that call using telephone 510A. In this manner, the agent views information associated with a particular called party with whom the agent is connected with.

Meanwhile, either simultaneously or at a different time, the application server 1005 may also be identifying those numbers in the dialing list which are unconfirmed wireless skip-trace numbers that require manual dialing. Upon identifying such a record in the dialing list, the application server 1005 may communicate the unconfirmed wireless skip-trace number and related account information to the computer 515B over facilities 1024. The application server may only communicate a number to the agent if that number meets a set of compliance requirements allowing the agent to dial the number. For example, only if the number can be dialed by the agent within the allowable calling window would that number be presented to the agent for dialing. The agent, who will see the information displayed on computer 515B, may then use telephone 510B to manually dial the number. The telephone 510B communicates with a switch 536 to originate the call. The type of telephone used and the associated protocol used to convey this to the switch 536 may be based on any number of technologies or protocols. The switch 536 may inform the application server 1005 of the call request via link 1027, so that the application server 1005 can track the number that was actually dialed by the agent. The switch 536 then proceeds with originating the call through the PSTN to the mobile device 565.

In this architecture, the application server 1005 provides the functionality for facilitating predictive dialing using the telephony server 504. The application server also informs an agent of unconfirmed wireless skip-trace numbers to dial and tracks the calls manually dialed by the other agent using the switch 536. In this embodiment, different workspaces are used by the different agents that involve different workstations (e.g., the telephone and computer). It should be noted that the predictively dialed call uses phone 510A and telephony server 504, whereas the manually dialed call uses telephone 510B and switch 536. Thus, the application server 1005 coordinates operation of both the telephony server and the switch, and further stores the dialing list, but is not involved in making the call itself—that is left to the telephony server or the switch, as may be the case.

Further, the functionality in the application server 1005 to handle various functions for predictive dialing may not be required nor used when processing the information associated with manually dialed calls provided on link 1027 from the switch 536. Similarly, the application server may have functions associated with processing the information on link 1027 which are not used for predictive dialing.

However, there are typically a number of functions which are common. For example, the application server 1005 may ensure that any numbers to be dialed on the dialing list conform with applicable calling windows, regardless of whether the dialing occurs via predictive or manual dialing. Specifically, contact centers usually limit the hours when calls may be attempted. This requires examining the time zone of each number to ascertain whether dialing it should be presently allowed. Other functions that may be required for both types of call origination include logging and reporting the call attempt, outcome, duration, measuring agent performance, handling unanswered calls, recording call dispositions, recording calls, etc.

Another function that the application server 1005 may enforce for both types of call origination include limiting the number of calling attempts for a given number. This capability limits the number of times a particular number can be dialed within a specified time frame. Once a call is answered, logic may limit any further attempts for a defined time frame. Or, if a call reaches busy or no-answer, the number may be attempted at a later time. This capability may be utilized whenever a number is dialed, regardless of whether the number is manually dialed or predictively dialed. This represents another example of functionality in the application server that may be used for both predictive and manual dialing.

Figure 10B:
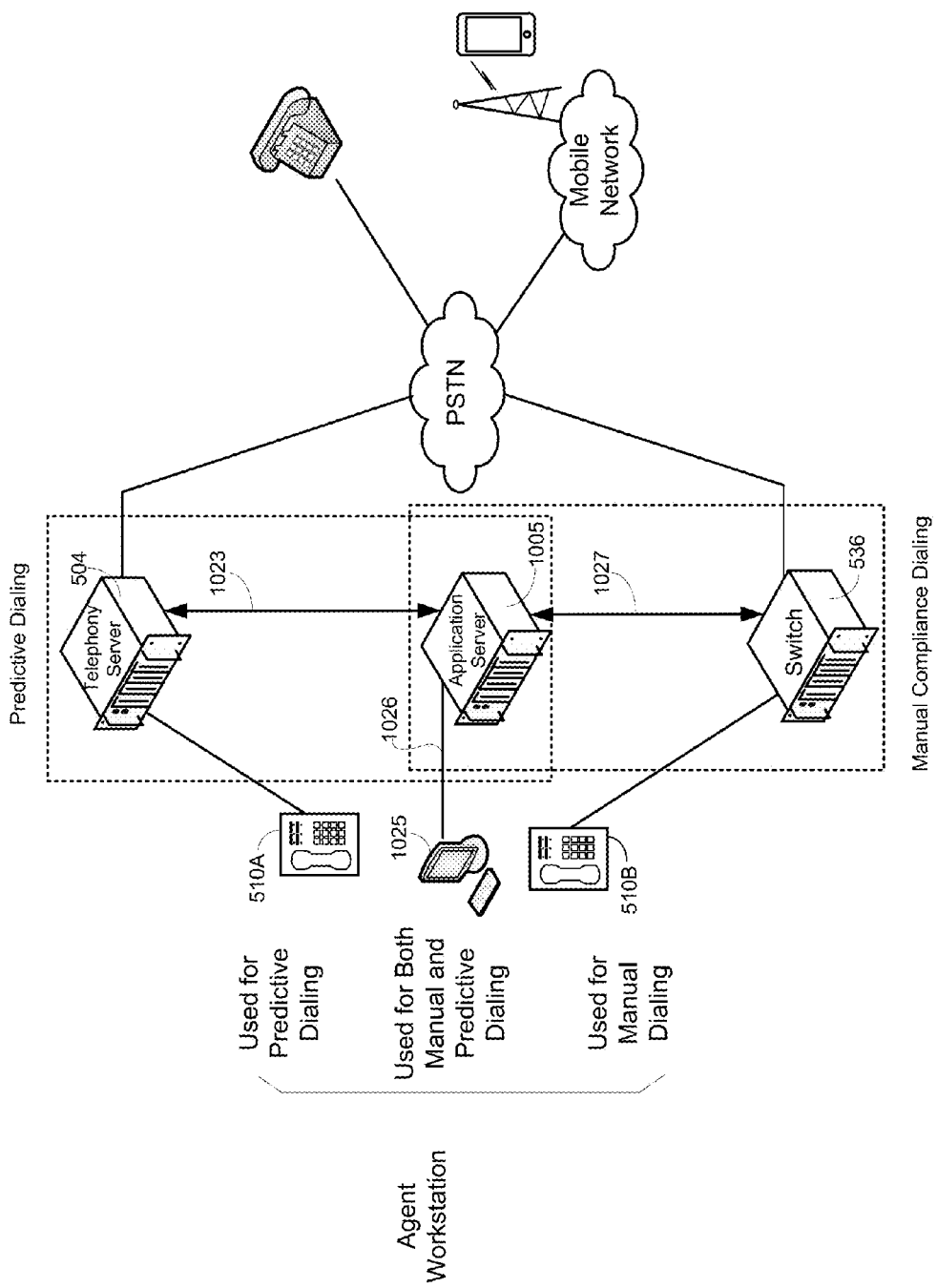

FIG. 10B illustrates another embodiment of a system using a single application server 1005 for coordinating predictively and manually dialed calls. A contact center operator may desire that a single agent in a single workspace is assigned to handle both predictively and manually dialed calls. The agent can do one type of call or the other at different times, but not simultaneously. In one embodiment, the agent may handle predictively dialed calls for part of a shift, and manually dialed calls for the remainder of the shift. Or, the agent could switch from one call type to another on a daily or hourly basis, or even alternate on a call-by-call basis.

In the embodiment shown in FIG. 10B, the agent uses a common computer 1025 in communication 1026 with the application server 1005 for viewing account information for both the predictively dialed connected call and the manually dialed call, as appropriate (at different times). The agent will then use one of two phones located in their workspace, either 510A for conversing on the predictively dialed call or telephone 510B for manually dialed calls. Again, the computer 1025 is not used for establishing either call per se, just processing the dialing list and coordinating/communicating with the appropriate telephony server or switch. In both cases, the computer can be used to log onto the system, send messages to the agent, present account information, receive disposition codes, etc.

Figure 10C:
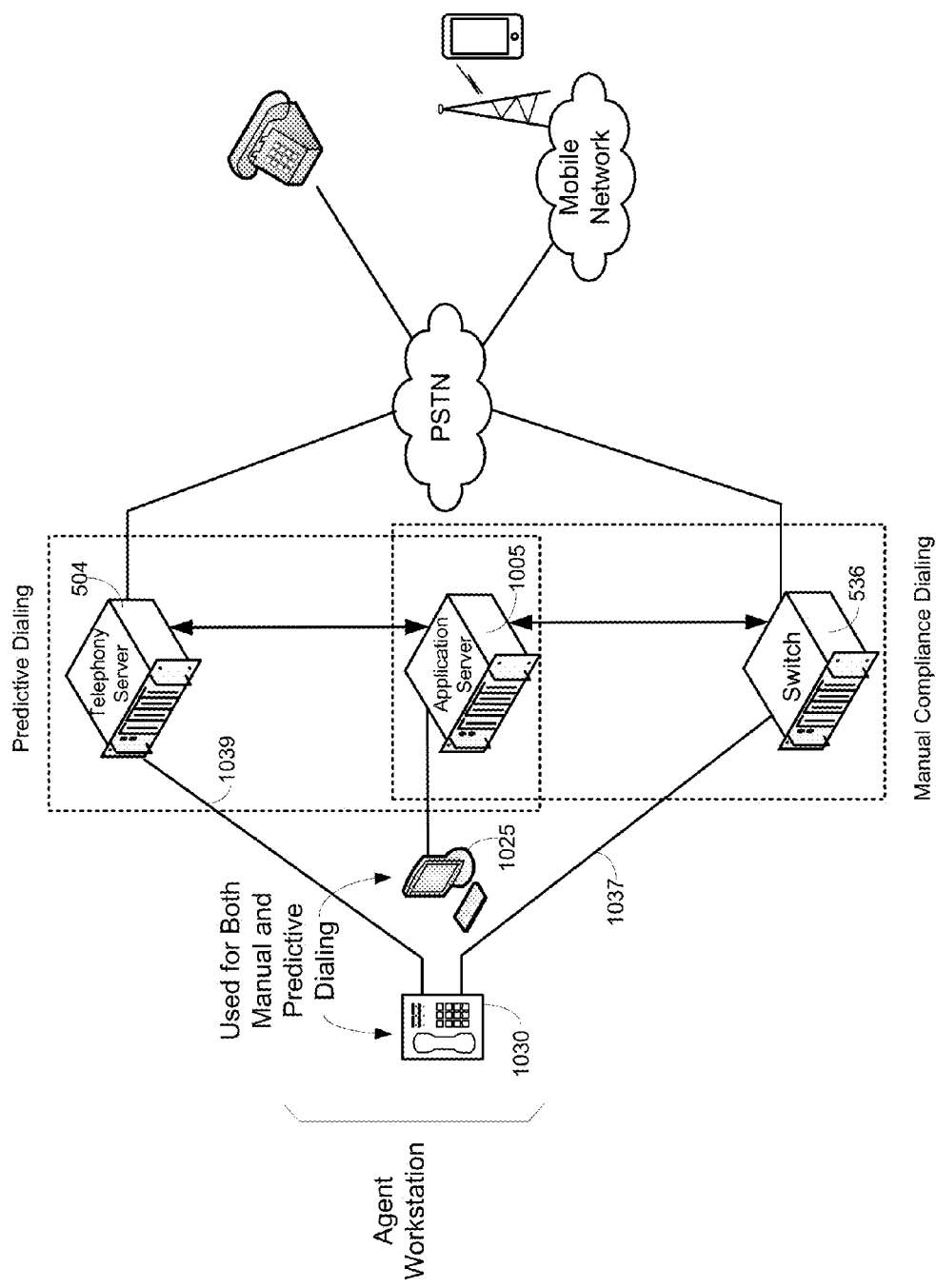

Another embodiment is shown in FIG. 10C. In this embodiment, rather than have two telephones in the agent's workspace, a single "two-line" phone 1030 is used. This may be a hard-wired phone as is known to those skilled in the art which is capable of handling two separate phone lines. This could be either a logical or physical telephone. In this case, one line 1039 is used to communicate with the telephony server 504 for predictively dialed calls and another line 1037 is used to communicate to the switch 536. This allows the same telephone to be used, in lieu of having two physical phones in the agent's workspace.

Figure 10D:
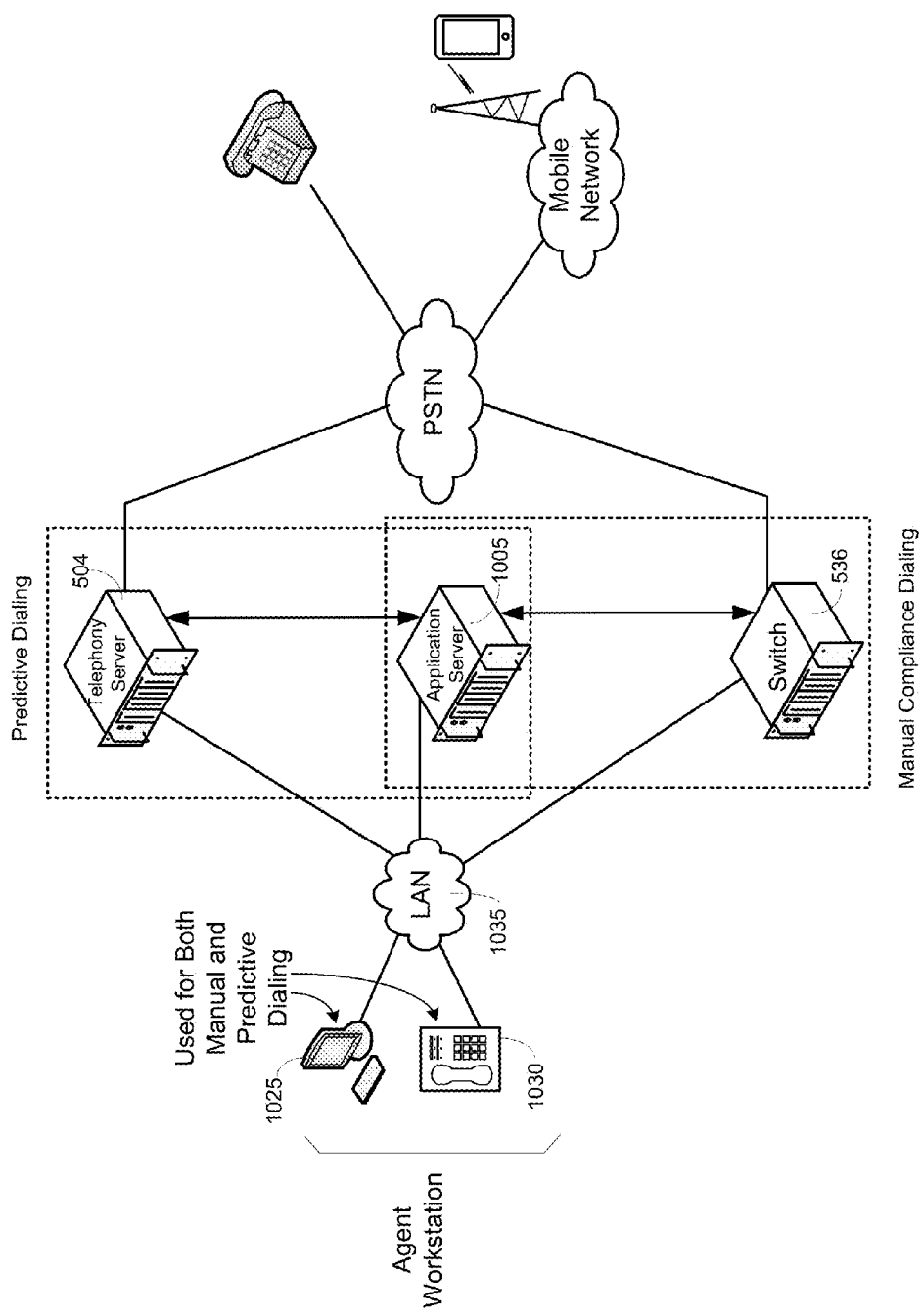

FIG. 10D illustrates another embodiment that further alters the communication aspects of the telephone 1030. In FIG. 10D a LAN 1035, or other similar facility, is used to facilitate communication between the agent's telephone 1030 to communicate with either the telephony server 504 or the switch 536 as required. The same LAN 1035 can be used to interconnect the computer 1025 with the application server 1005. Thus, FIG. 10D can be viewed as a slightly different logical variation of a single telephone being used for different call types at different times. Consequently, the agent's workstation comprises a single logical telephone and computer, which can be used for manually or predictively dialed calls, but not both at the same time.

Figure 10E:
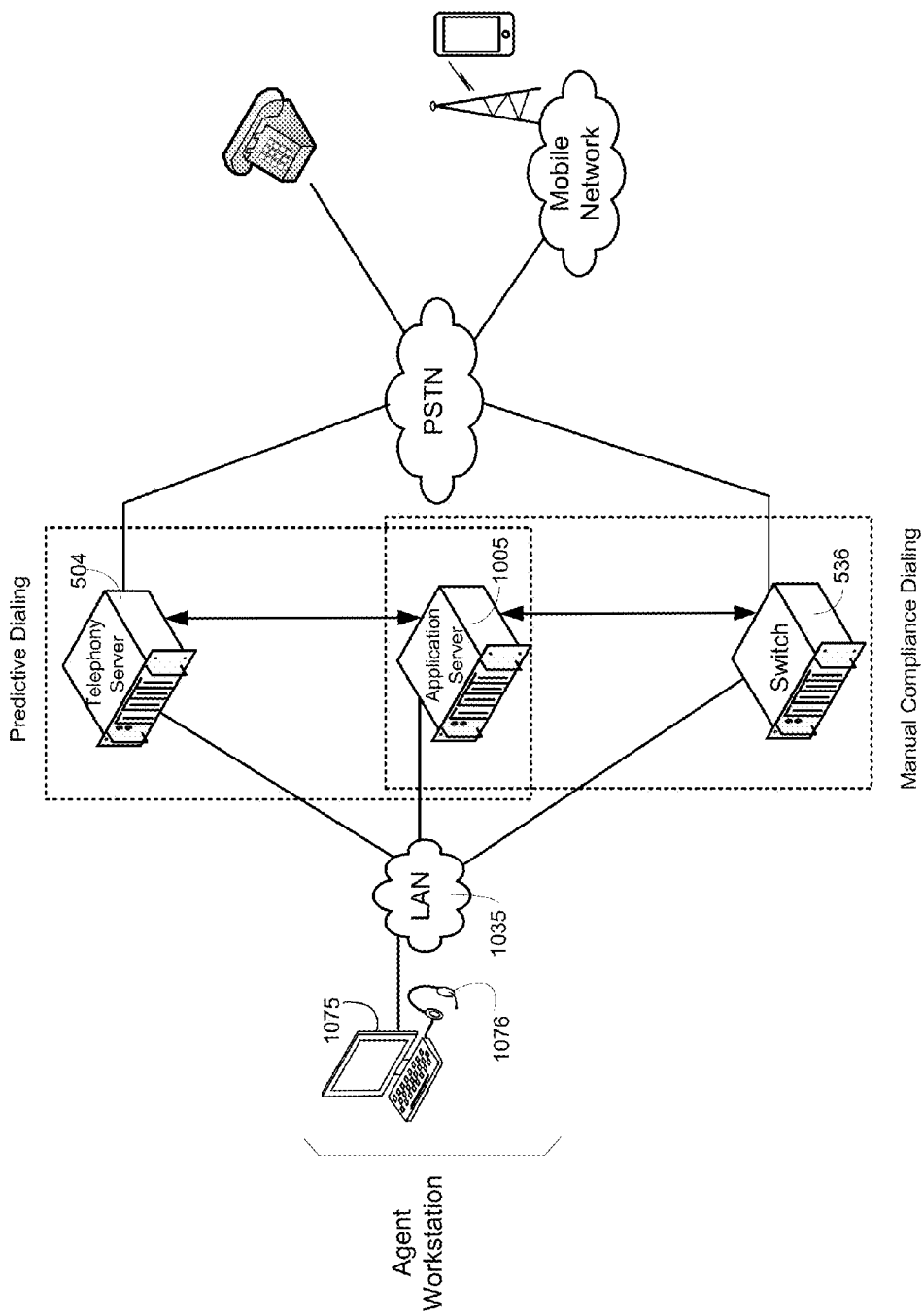

Finally, FIG. 10E represents another embodiment wherein the functionality of the telephone is implemented in the agent's computer using the processing capabilities of the agent's computer. This represents use of a so-called softphone, wherein the telephone functionality is implemented via software in the computer 1075. By adding a headset 1076, the computer 1075 can process both speech-in and speech-out for a call. Such soft-phones are well known in the art, and may rely on various technologies. In this embodiment, the computer 1075 is also connected to the LAN 1035, and the physical connection between the computer and LAN can carry both data and digitized voice on separate logical channels.

It should be mentioned that the various arrangements for interconnecting the telephone and computers in the agent's workstation space as shown in FIGS. 10B-10E may also be applied to FIG. 5. Thus, it is possible for a single workspace to comprise a single computer and/or single phone that can operate with both the manual compliance dialing sub-system and the predictive dialing sub-system indicated in FIG. 5, although not at the same time.

Regardless of the embodiment used (e.g., FIGS. 10A-10E, or some other alternative), the agent is presented on the computer with an unconfirmed, wireless, skip-trace number which the agent then manually dials using the phone device. The dialing may be accomplished by pressing a keypad on a physical phone or dial pad, selecting digits on a screen using a pointing device, or some other technology. It may be possible in some embodiments to allow the agent to select the number to be dialed via a single input action (e.g., using the mouse to select the number, a.k.a. 'click-to-dial').

Assuming that the call initiated by the agent does reach a live person, the agent will confirm whether the person is the intended party, e.g., whether the number is still current for that individual, and/or whether the number is authorized to reach the individual. Once confirmed, the agent can then enter a disposition code into their computer, which is communicated to the application server, so that the appropriate field in the record for that number is updated to reflect that the number has been confirmed. This means that the number will not be manually dialed when the list is next processed by the application server, and that the number can then be later predictively dialed, if the need arises (assuming, of course, the individual has provided consent for doing so).

Figure 11:
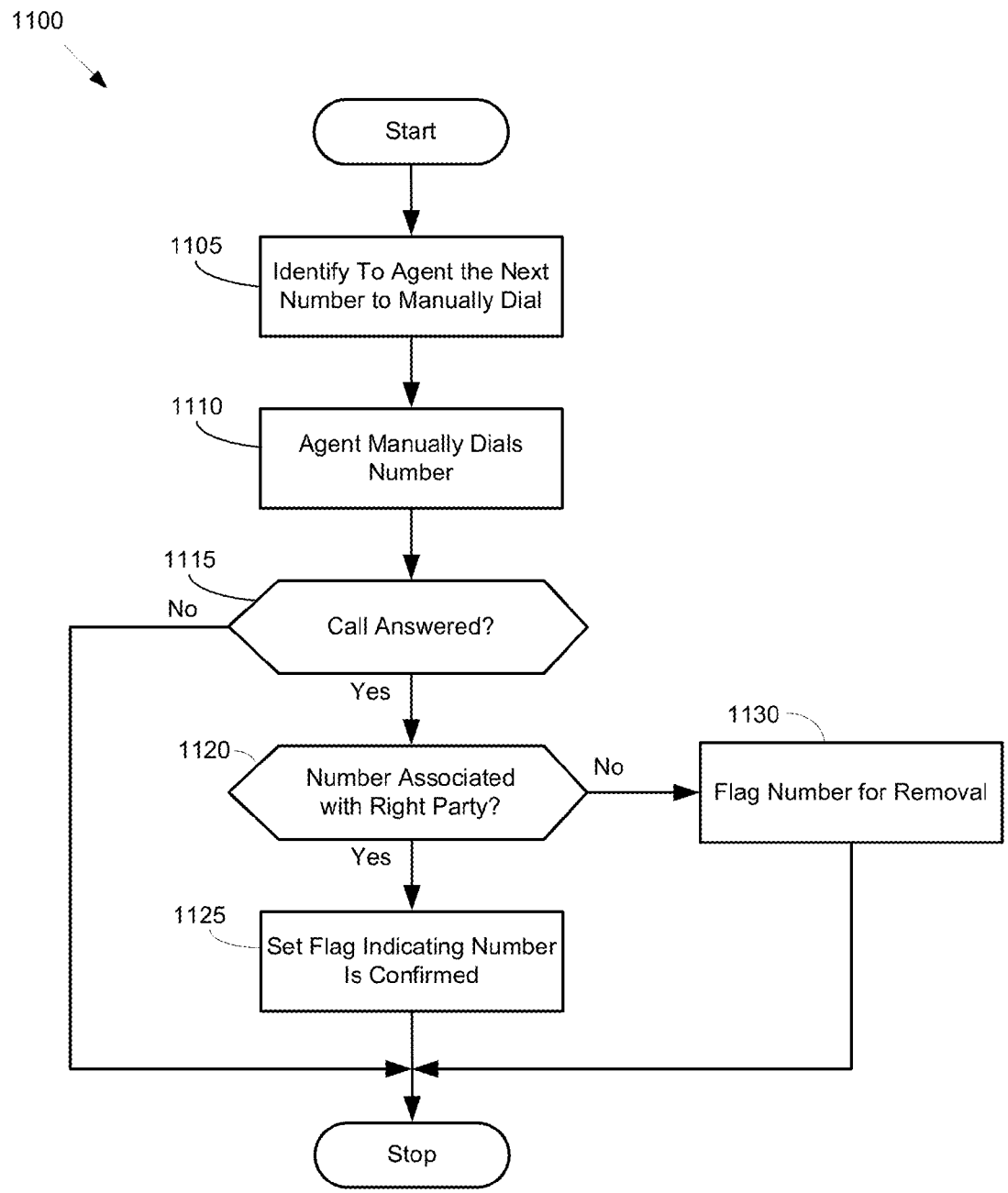
FIGS. 11-12 illustrate embodiments of process flows associated with processing the single dialing list.

The process flow for an agent confirming an unconfirmed wireless skip-trace number is shown in FIG. 11. In FIG. 11, the process 1100 begins with the application server identifying the next number to manually dial and presenting this number to the agent. This typically involves the application server presenting the number and related account information on the computer in operation 1105. The agent, upon reviewing the information then manually dials the number using the telephone at their workspace in operation 1110. If the call is not answered in operation 1115, the process is completed. (In other embodiments, the next record, which may be another wireless, unconfirmed, skip-trace number, may be retrieved by looping back to operation 1105.)

If the call is answered by a live party in operation 1115, then the agent can inquire if the number is still associated with the intended party in operation 1120. If not, the number is obsolete and the agent can enter a disposition code. This may indicated that the number may be flagged for removal from the dialing list in operation 1130. Because the number is not associated with the intended party, there is no need to dial this number again. If the number is confirmed as being associated with the party, then the flag is set indicating the number is confirmed in operation 1125. This may be accomplished by the agent entering a different disposition code into computer, which the application server knows is associated with the last manually dialed number. The application server can then set the flag as appropriate. Similarly, the agent can also confirm the user's consent for using this number. This means that the number can be indicated in the dialing list for use in future predictive dialing. Specifically, there is no need to segregate the number any further for manual dialing once it is confirmed.

Regardless of whether a single-list or dual-list architecture is used in the contact center, the agent must be able to indicate that the number has been confirmed upon reaching a live party that confirms the number, and the application server will set the appropriate indication(s) in the record so that it can be processed properly in the future, regardless of whether the single or dual list embodiment is used (or some other variation).

Figure 12:
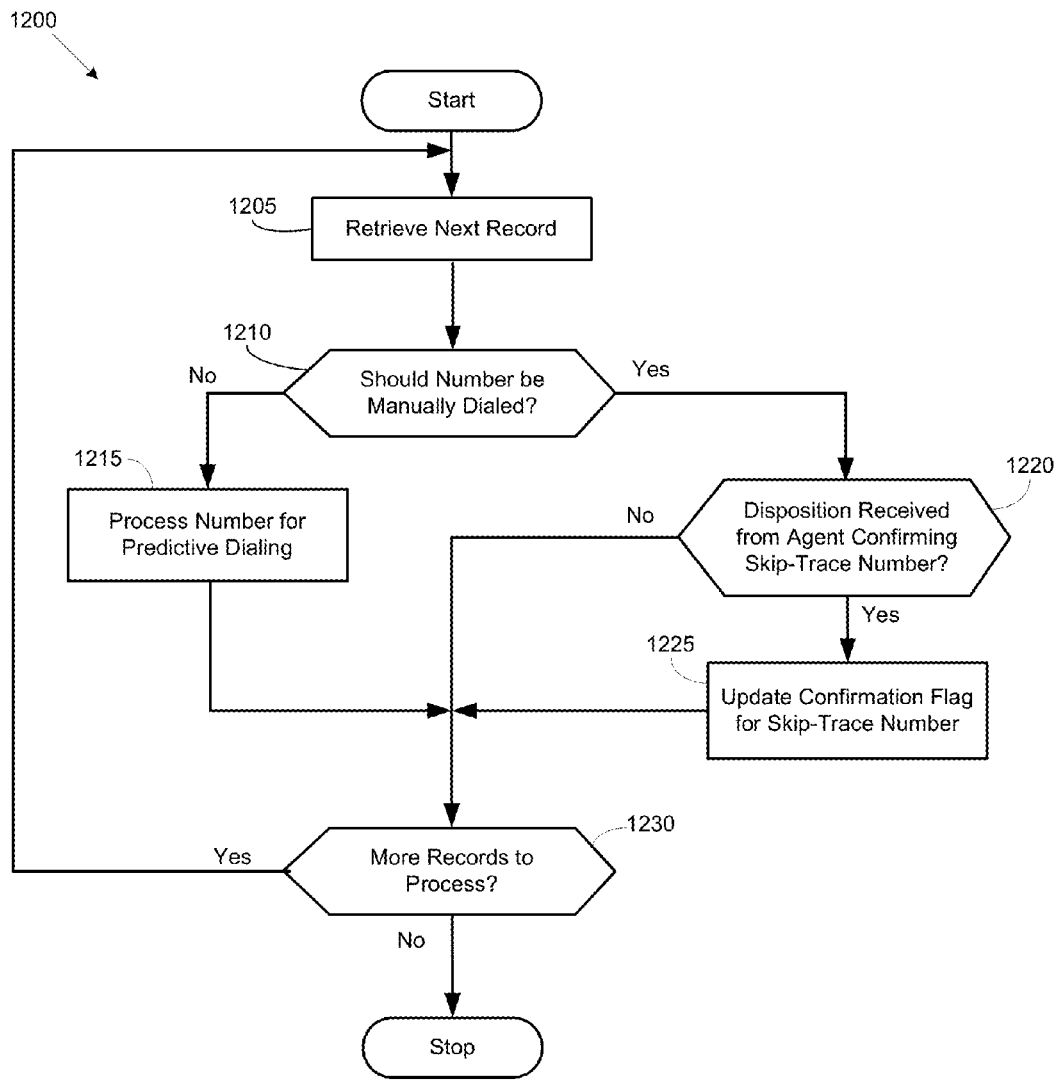

FIG. 12 illustrates a process flow at a high level of one embodiment when the application server processes a single, integrated list. Turning to FIG. 12, the process 1200 begins with the application server 1005 retrieving the next record in the dialing list in operation 1205. Based on the various fields in the record, a determination is made in operation 1210 whether the number should be manually dialed. Specifically, unconfirmed, wireless, skip-trace numbers should be manually dialed. If the determination is "no", then the record can be predictively dialed in operation 1215. If the answer from operation 1210 is "yes," then the process flow continues to operation 1220. The agent may receive a confirmation from the answering party, and may set a confirmation flag as appropriate. If the confirmation is received, then the application server updates the confirmation indication field in the record in operation 1225. If not, then the flag remains unchanged. In any case, the processing for the record is complete, and a test in operation 1230 determines whether there are additional records to process in the dialing list.

Although the process flow above pertains to a single integrated list, many of these functions are similar for processing a dual-list approach. Specifically, FIG. 12 would reflect similar processing for the manual dialing list, and upon confirming the number in operation 1220, that record could be removed from the manual dialing list and added to the predictive dialing list.

The processing flow shown in FIG. 12 may operate with two groups of agents, which may simultaneously handle predictively dialed and manually dialed calls. The process flow shown in FIG. 12 may be modified based on whether groups or individual agents are assigned to a particular form of dialing and for how long.

SUMMARY

Figure 13:
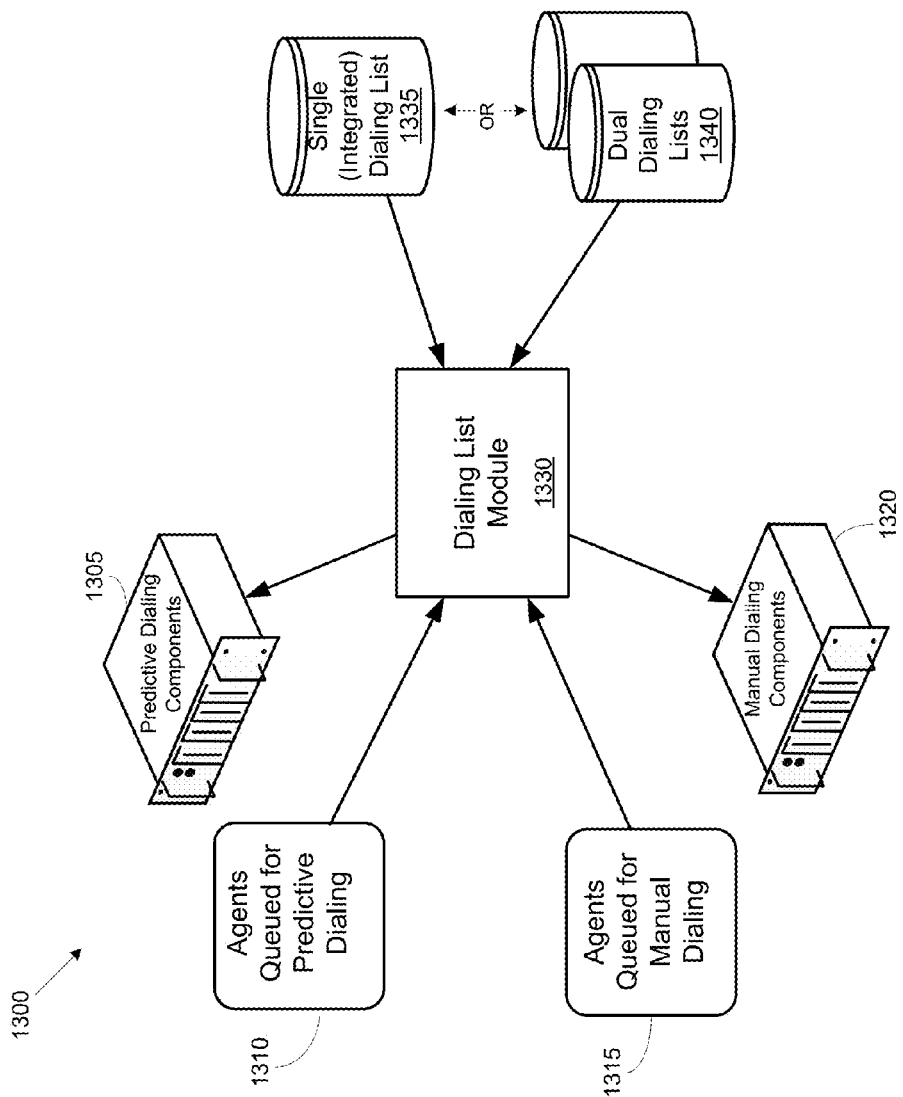
FIG. 13 illustrates a dialing list module incorporated into a system for practicing the concepts and technologies disclosed herein.

FIG. 13 illustrates one high level embodiment of some of the functional components in a system 1300 constructed according to the principles and concepts disclosed herein. A dialing list module 1330 manages and processes the dialing list, which can be a single, integrated dialing list 1335 or dual dialing lists 1340. Other hybrid arrangements are possible, since a single list can be logically viewed as multiple lists by applying the appropriate filters and processing algorithms.

The dialing list module retrieves the appropriate list and processes each number in the list according to whether the number can be dialed using an ADS, such as a predictive dialer, or whether that number should be dialed manually. If the number can be processed via a predictive dialer, then the dialing list module coordinates with the appropriate predictive dialing components 1305. In various embodiments, the dialing list module 1330 may maintain a queue of agents allocated to predictive dialing 1310, so that the appropriate number of predictive dialing numbers are provided so as to keep the queued agents busy, but without overwhelming the agents, nor causing an excessive number of calls to be abandoned. In other embodiments, the predictive dialing components 1305 (not the dialing list module 1330) may manage the queues of agents 1310, and communicate as appropriate with the dialing list module when additional records are needed.

If the number is able to be processed via manual dialing, the dialing list module may maintain a queue of agents for manual dialing 1315. If agents are available, the dialing list module may coordinate and provide the information to the manual dialing components 1320. Other variations in this architecture are possible as well.

The dialing list module 1330 may be implemented in the aforementioned application server, which may be considered as part of the manual dialing components, or as one of the predictive dialing components. Further, the various components described herein may be premise based (e.g., co-located with the agent workstations) or may be remotely located from the contact center (cloud-based). Thus, it is possible to have a premised based switch in a contact center communicating with a cloud-based application server for processing manually dialed calls.

Other Embodiments

The application disclosed herein is illustrated in the context of a debt-collector attempting to reach a debtor, and involving the use of skip-trace numbers where the current number for the debtor is obsolete. However, the principles disclosed herein are not limited in application to only this context. The principles can be applied to any context where a new or replacement number is obtained for a dialing list and for non-debt collection purposes. For example, instead of obtaining a current number from a skip-trace vendor, a telephone number information provider or directory service provider may be queried to obtain the current number. Other service providers for providing current telephone numbers are known in the art. The new or replacement number may be a wireless number, and it is possible that the new or replacement number is not properly associated with the intended party. For example, an individual may report an updated number, but an error in entering the number may have occurred. Or, the replacement number may have been for a person with a similar name. In either case, a new number is obtained that is not confirmed and potentially could be incorrect. This could be treated as an unconfirmed skip-trace number.

Consequently, whenever a new wireless number is detected in a dialing list, i.e., one which may not have been confirmed previously, this may be a basis for the contact center operator to segregate out that number for manual dialing. In another application, the target individual may have revoked their express consent for dialing that number using an autodialer, and consequently manual dialing should be used to contact that individual. It is possible that after manually contacting the individual, the individual again provides consent to use that number for predictive dialing. Thus, a number without consent may be treated similarly to a number that is unconfirmed. Consequently, the concepts and technologies may be used for dialing a number for which consent does not exist.

For example, an individual may have consented to be called using an autodialer on a specific number. That individual, however, then indicates a new number that should be used. However, the indication may not be clear as to whether that new number can be dialed using an autodialer and/or the old number should not be used. The contact center may indicate that the new number should be dialed number manually, until a clear confirmation of consent is obtained from the individual that the new number may be used to call them using an autodialer. In another example, an individual may have provided a wireless number with consent to receive a text message. However, it is not clear whether that consent also applies to receiving a voice call. The contact center may maintain information in the record indicating whether the consent and confirmation applies separately for text and voice calls. Thus, if consent is unclear or has not been obtained for a voice call, the contact center may manually dial the number and obtain consent from the individual. Consequently, the concepts and technologies may be used separately for text and voice calls to a number.

In another embodiment, the different type of call treatment may reflect that a user has expressly withdrawn their consent for being autodialed for a particular call type on a particular number (e.g., the user does not want to receive any more text messages at that number, but will accept voice calls). Thus, the record may maintain information that consent has been withdrawn. This may be the same default setting that is used until consent is expressly received. Thus, it is possible that a number may be predictively dialed because the number is confirmed and consent had been granted, however the agent upon speaking with the individual receives an indication that consent is withdrawn. In this case, the agent could enter a disposition code that would cause the appropriate field in the call record to be updated.

Thus, it should be evident that the procedures defined above with respect to a "confirmed" number are also applicable to a "consented" number. Consequently, just as an agent may encounter a person informing the agent the number is obsolete, the agent may encounter a person revoking consent for the number used. The agent could similarly enter a disposition code that would update the consent field in the record. This could cause the system to process this number in a dialing list for manual dialing, as opposed to predictive dialing. Thus, a number which does not have consent would be treated similar to an unconfirmed numbers.

It should also be apparent that the particular embodiments described herein are illustrative. For example, the names and format of the particular fields in the records for the dialing list disclosed herein may vary from one embodiment to another. The processes used for establishing the lists, and how they are updated, may vary as well. As noted earlier, skip-trace numbers may be obtained in real-time as obsolete numbers are detected, or these could be batched up and periodically obtained. Further, the principles and concepts apply to non-debt collection calls. Those skilled in the art will recognize in light of this disclosure that various alternatives are possible to accomplish the indicated functions.

Application with Preview Dialing

The above has been illustrated using an ADS that may be a predictive dialer. Other forms of dialers may be used, such as those known in the industry as power dialers, preview dialers, and other forms. Preview dialing is a form of dialing that involves presenting information to an agent, which typically includes the name and account information associated with a record in a dialing list. This allows the agent to study the account prior to establishing a call to that individual. In various embodiments, the information is displayed to the agent for a fixed amount of time, after which the ADS automatically initiates a call to the corresponding number. In other embodiments, the agent may review the information until they are ready to handle the call, at which time the agent may indicate they are ready, and then the ADS initiates the call.

The concepts and technologies above could be used with preview dialing. Thus, a call which was previewed dialed by an ADS may encounter an obsolete number. The answering party, for example, may indicate the number has been reassigned. The agent may indicate the corresponding disposition code, and the ADS may obtain a skip trace number. Later, when that same record is encountered, the ADS may determine that the number is an unconfirmed wireless skip-trace number, and indicate to the agent that the number must be manually dialed.

Seamless Transition to Manual Dialing Upon Encountering a Skip-Trace Number

As discussed above, it is possible that upon encountering an obsolete number, that a batch request for a skip-trace number may be made after processing the dialing list. Then, once the dialing list has been updated, the same record may be processed upon reloading and processing the dialing list again at a later time. Thus, there may be a significant period of time between the agent first encountering the obsolete number and that account being attempted again using the skip-trace number.

As noted above, an agent may study the details of an account prior to making a call. Though this may be for a relatively short time (e.g., 30 seconds), it is evident that this process is typically repeated if that account is dialed again at a later time. It is certainly possible, further, that another agent may be handling the reattempt using the skip-trace number. This reflects a duplication of the agent's time in studying the account details.

To address this issue and to avoid the duplication in effort, one embodiment may seamlessly transition to manual dialing using the concepts and technologies disclosed herein. Specifically, after encountering an obsolete number (regardless of the form of ADS dialer) and the agent entering the disposition code, the ADS immediately initiates a skip-trace query in real-time. Assuming a number is returned, the ADS updates the record accordingly. Then, the ADS indicates to the agent that a skip-trace number has been obtained, and that the agent should manually dial such number. The agent can then manually dial the number, and the ADS knows that the number dialed is the skip-trace number. Assuming the call is answered, the agent is then able to confirm the number and enter the appropriate disposition code. In this way, the agent is able to seamlessly migrate from processing automatically dialed calls to a manually dialed call upon encountering an obsolete number. Once the skip-trace call is completed, the ADS may transition that same agent back to automatically dialed calls.

In this mode of operation, it is usually desirable for the agent to remain at the same physical workspace. Preferably, the agent uses the same computer workstation for reviewing account information and system commands for predictive dialing as for manual dialing in order to seamlessly transition from handling an automatically dialed call to handling a manually dialed call. This avoids the agent from moving to another work space location when handling the skip-trace call, and having to return to the original location to continue handling automatically dialed calls. This can be accomplished using the single list processing associated with the architecture of FIGS. 10A-10E. It is even more preferable if the agent uses the same telephone equipment for conversing with individuals that have been dialed by the ADS and that have been manually dialed. This could be accomplished using, e.g., the architectures shown in FIGS. 10C-10D. This minimizes the agent impact when transitioning from an automatically dialed call to a manually dialed call, and back to an automatically dialed call. Recall that it was mentioned that an agent could transition from one dialing mode to the other on a call-by-call basis. The above example illustrates why it may be desirable to seamlessly transition from predictive dialing, then to manual dialing for a single call, and then back to predictive dialing on a call-by-call basis.

Exemplary Computer Processing Device

Figure 14:
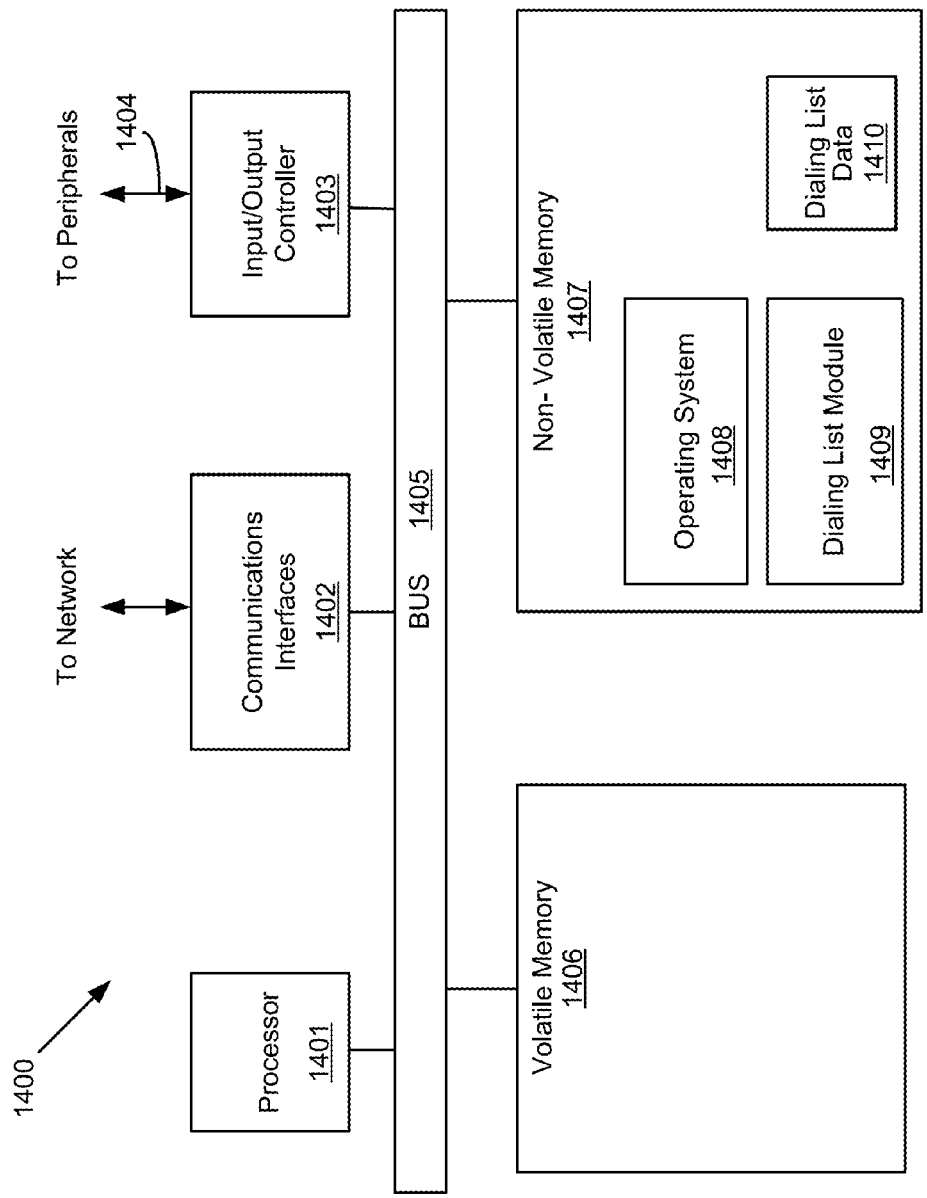
FIG. 14 illustrates a high level architecture of a processing system for practicing the concepts and technologies disclosed herein.

FIG. 14 is an exemplary schematic diagram of a computer processing system that may be used in an embodiment for any one of the components used in the contact center architecture to practice the technologies disclosed herein. In general, the term "computer processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

As shown in FIG. 14, the processing system 1400 may include one or more processors 1401 that may communicate with other elements within the processing system 1400 via a bus 1405 or some other form of communication facility. The processor 1401 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 1400 may also include one or more communications interfaces 1402 for communicating data via the local network with various external devices, including those shown in FIG. 5 and FIGS. 10A-10E, as well as with skip-trace vendors. In various embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 1403 may also communicate with one or more input devices or peripherals using an interface 1404, such as, but not limited to: a keyboard, a mouse, a touch screen/display input, microphone, pointing device, etc. The input/output controller 1403 may also communicate with output devices or peripherals, such as displays, printers, speakers, headsets, banner displays, other components in the contact center, etc. These may be used, in part, to receive data, such as dialing lists retrieved from an external database.

The processor 1401 may be configured to execute instructions stored in volatile memory 1406, non-volatile memory 1407, or other forms of computer readable storage media accessible to the processor 1401. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 1407 may store program code and data, which also may be loaded into the volatile memory 1406 at execution time. Specifically, the non-volatile memory 1407 may store a dialing list processing module 1409 that may perform the above mentioned process flows and/or operating system code 1408 containing instructions for performing the process and/or functions associated with the technologies disclosed herein. The dialing list module 1409 may also access the various dialing list data 1410 disclosed above and process the related fields described above. The volatile memory 1406 and/or non-volatile memory 1407 may be used to store other information including, but not limited to: records, applications, programs, scripts, source code, object code, byte code, compiled code, interpreted code, machine code, executable instructions, or the like. These may be executed or processed by, for example, processor 1401. These may form a part of, or may interact with, the dialing list module 1409. In some embodiments, the dialing list module 1409 may be integrated in another component.

The technologies described herein may be implemented in various ways, including as computer program products comprising memory storing instructions causing a processor to perform the operations associated with the above technologies. The computer program product comprises a non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified computer readable media (including volatile and non-volatile media), but does not include a transitory, propagating signal, nor does it encompass a non-tangible computer readable medium. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A method for processing a dialing list by a contact center, comprising:
retrieving the dialing list comprising a plurality of records from a database by an automated dialing system, each record comprising a corresponding telephone number and a corresponding confirmation indicator, wherein a corresponding individual is associated with each record, and wherein the confirmation indicator indicates whether the corresponding telephone number is confirmed as being associated with the corresponding individual;
analyzing a particular record among the plurality of records by the automated dialing system, wherein the corresponding confirmation indicator of the particular record indicates the corresponding telephone number of the particular record is unconfirmed;
determining by the automated dialing system that the corresponding telephone number of the particular record should be manually dialed based on the corresponding confirmation indicator of the particular record indicating the corresponding telephone number of the particular record is unconfirmed;
providing the corresponding telephone number of the particular record to a computer for display to an agent in the contact center;
originating a call from the contact center in response to the agent manually dialing the corresponding telephone number of the particular record, wherein the call is answered by an answering party;
receiving at the automated dialing system a disposition code for the call from the agent, the disposition code indicating the agent verified with the answering party that the corresponding telephone number of the particular record is associated with the corresponding individual associated with the particular record;
in response to receiving the disposition code, modifying the corresponding confirmation indicator of the particular record by the automated dialing system to reflect the corresponding telephone number of the particular record is confirmed thereby creating a modified record; and
storing the modified record in the dialing list.

2. The method of claim 1, wherein the corresponding telephone number of the particular record is a wireless number.

3. The method of claim 2, further comprising:
retrieving the modified record in the dialing list by the automated dialing system at a subsequent time relative to storing the modified record in the dialing list;
analyzing the modified record by the automated dialing system to determine whether the corresponding confirmation indicator for the modified record indicates the corresponding telephone number for the modified record is confirmed; and
dialing the corresponding telephone number of the modified record by the automated dialing system in response to determining the corresponding confirmation indicator for the modified record indicates the corresponding telephone number for the modified record is confirmed.

4. The method of claim 1, wherein the particular record further comprises a type of number indicator and the method further comprises:
determining by the automated dialing system that the type of number indicator of the particular record indicates the corresponding telephone number of the particular record is a wireless number.

5. The method of claim 2, wherein originating the call from the contact center in response to the agent manually dialing the corresponding telephone number of the particular record comprises the agent pressing a series of digits corresponding to the corresponding telephone number of the particular record on a telephone device, and the method further comprises providing a name of the corresponding individual to the computer for display to the agent.

6. The method of claim 5, wherein the telephone device is connected to a private branch exchange switch that originates the call.

7. The method of claim 2, wherein originating the call from the contact center in response to the agent manually dialing the corresponding telephone number of the particular record comprises the agent interacting with a telephone device comprising a soft-phone by selecting a series of digits displayed on the computer corresponding to the corresponding telephone number of the particular record.

8. The method of claim 7, wherein originating the call from the contact center comprises originating a SIP-based call from a switching system in the contact center.

9. The method of claim 1, further comprising:
analyzing a second record in the dialing list by the automated dialing system, wherein the second record comprises a second corresponding telephone number and a second corresponding confirmation indicator indicating the second corresponding telephone number is confirmed; and originating a second call from the contact center by the automated dialing system originating a the second call in a predictively dialed manner based on the second corresponding confirmation indicator indicating the second corresponding telephone number is confirmed.

10. The method of claim 9 further comprising:
connecting a second agent in the contact center to the second call.

11. A method for processing a dialing list by a contact center, comprising:
retrieving the dialing list comprising a plurality of records from a database by a automated dialing system, each record comprising a corresponding telephone number, a corresponding confirmation indicator, and a corresponding identifier of an individual associated with the record and wherein the confirmation indicator indicates whether the corresponding telephone number is confirmed as being associated with the corresponding individual;
analyzing a particular record among the plurality of records by the automated dialing system, wherein the corresponding confirmation indicator of the particular record indicates the corresponding telephone number of the particular record is confirmed;
determining by the automated dialing system that the corresponding telephone number of the particular record should be predictively dialed based on the corresponding confirmation indicator of the particular record indicating the corresponding telephone number of the particular record is confirmed;
originating a call from the contact center, wherein the call is answered by an answering party;
receiving a disposition code at the automated dialing system indicating the corresponding telephone number of the particular record is no longer associated with the individual associated with the particular record;
modifying an obsolete indicator of the particular record by the automated dialing system to reflect the corresponding telephone number of the particular record is obsolete;
obtaining a skip-trace number for the individual associated with the particular record; and
storing the skip-trace number in the particular record wherein the corresponding confirmation indicator of the particular record indicates the skip-trace number is unconfirmed.

12. The method of claim 11 further comprising:
retrieving the dialing list by the processing system at a time subsequent to storing the skip trace number in the particular record;
analyzing the particular record by the automated dialing system; and
determining by the automated dialing system that the skip trace number of the particular record should be manually dialed based on the corresponding confirmation indicator of the particular record indicating the skip-trace number is unconfirmed.

13. The method of claim 11, further comprising:
connecting the call with an agent;
determining by the agent conversing with the answering party that the corresponding telephone number of the particular record is no longer associated with the individual associated with the particular record; and
providing the disposition code by the agent using a computer that displays the corresponding identifier of the individual associated with the particular record and account information associated with the individual.

14. The method of claim 11, wherein the particular record further comprises a number type indicator set to reflect that the skip-trace number is a wireless number.

15. A non-transitory computer readable medium storing instructions that when executed cause a processor to:
retrieve a dialing list comprising a plurality of records from a database, each record comprising a corresponding telephone number, a corresponding dial-type indicator indicating whether to dial the corresponding telephone number using an automatic dialing system, and a corresponding identifier of an individual associated with the record;
analyze a particular record from the plurality of records, wherein the corresponding dial-type indicator of the particular record indicates the corresponding telephone number of the particular record should not be dialed using the automatic dialing system;
determine that the corresponding telephone number of the particular record should be manually dialed based on the corresponding dial-type indicator of the particular record indicating the corresponding telephone number of the particular record should not be dialed using the automatic dialing system;
provide the corresponding telephone number of the particular record to a computer for display to an agent in a contact center for manual dialing;
receive a message indicating of a call originating from a switch to the corresponding telephone number of the particular record, wherein the message is received after providing the corresponding telephone number of the particular record to the computer for display to the agent and the agent manually dials the corresponding telephone number of the particular record;
receive a disposition code from the computer; and
in response to receiving the disposition code, modifying the corresponding dial-type indicator for the particular record to reflect the corresponding telephone number of the particular record may be dialed using the automatic dialing system.

16. The non-transitory computer readable medium of claim 15, further storing instructions that when executed cause the processor to:
retrieve the particular record in the dialing list at a subsequent time relative to modifying the corresponding dial-type indicator of the particular record;
determine the corresponding dial-type indicator of the particular record indicates the corresponding telephone number of the particular record may be dialed using the automatic dialing system; and
cause the telephone number to be automatically dialed by the automatic dialing system.

17. The non-transitory computer readable medium of claim 16, further storing instructions that when executed cause the processor to:
display the corresponding identifier of the individual associated with the particular record along with account information on a computer used by the agent.

18. The non-transitory computer readable medium of claim 15, further storing instructions that when executed cause the processor to:
analyze a second record in the dialing list, wherein the second record comprises a second corresponding telephone number and a second corresponding dial-type indicator indicating the second corresponding telephone number may be dialed by the automatic dialing system; and cause a second call to be originated for the second corresponding telephone number from the contact center by the automatic dialing system in a predictively dialed manner.

19. The non-transitory computer readable medium of claim 18, further storing instructions that when executed cause the processor to:
connect the second call to a telephone device previously used by the agent to communicate with the call.

20. A non-transitory computer readable medium storing instructions that when executed cause a processor to:
retrieve a dialing list comprising a plurality of records from a database wherein each record comprises a corresponding telephone number and a corresponding confirmation indicator, wherein the confirmation indicator indicates whether the corresponding telephone number is confirmed as being associated with a corresponding individual;
analyze a particular record from the plurality of records, wherein the corresponding confirmation indicator of the particular record indicates the corresponding telephone number of the particular record is confirmed with the corresponding individual of the particular record;
determine that the corresponding telephone number of the particular record should be predictively dialed based on the corresponding confirmation indicator of the particular record indicating the corresponding telephone number of the particular record is confirmed with the corresponding individual of the particular record;
cause a call to originate from an automatic dialing system, wherein the call is answered by an answering party;
receive a disposition code indicating the corresponding telephone number of the particular record is no longer associated with the corresponding individual of the particular record;
obtain a skip-trace number associated with the corresponding individual of the particular record; and
store the skip-trace number in the particular record wherein the corresponding confirmation indicator of the particular record indicates the skip-trace number is unconfirmed.

* * * * *